US008060011B2

(12) United States Patent
Jin

(10) Patent No.: US 8,060,011 B2
(45) Date of Patent: *Nov. 15, 2011

(54) POWER TRANSMISSION CONTROL DEVICE, POWER TRANSMISSION DEVICE, ELECTRONIC INSTRUMENT, AND NON-CONTACT POWER TRANSMISSION SYSTEM

(75) Inventor: Mikimoto Jin, Chino (JP)

(73) Assignee: Seiko Epson Corporation, Tokyo (JP)

( * ) Notice: Subject to any disclaimer, the term of this patent is extended or adjusted under 35 U.S.C. 154(b) by 816 days.

This patent is subject to a terminal disclaimer.

(21) Appl. No.: 12/071,371

(22) Filed: Feb. 20, 2008

(65) Prior Publication Data

US 2008/0197713 A1  Aug. 21, 2008

(30) Foreign Application Priority Data

Feb. 20, 2007 (JP) ................................. 2007-039548
Dec. 14, 2007 (JP) ................................. 2007-323197

(51) Int. Cl.
*H04B 5/00* (2006.01)

(52) U.S. Cl. .................... 455/41.1; 455/41.2; 455/127.1; 455/572; 455/573; 320/108

(58) Field of Classification Search ............... 455/127.1, 455/41.1, 41.2, 573, 572; 320/108
See application file for complete search history.

(56) References Cited

U.S. PATENT DOCUMENTS

| 5,329,274 | A | 7/1994 | Donig et al. |
| 5,345,231 | A | 9/1994 | Koo et al. |
| 5,367,242 | A | 11/1994 | Hulman |
| 5,896,278 | A * | 4/1999 | Tamura et al. .................. 363/20 |
| 6,118,429 | A | 9/2000 | Kasai et al. |
| 6,316,909 | B1 | 11/2001 | Honda et al. |
| 6,459,882 | B1 * | 10/2002 | Palermo et al. ............. 455/41.1 |
| 6,873,823 | B2 | 3/2005 | Hasarchi et al. |
| 7,525,283 | B2 * | 4/2009 | Cheng et al. .................. 320/108 |
| 7,554,316 | B2 * | 6/2009 | Stevens et al. ................ 323/355 |
| 7,804,197 | B2 * | 9/2010 | Iisaka et al. .................... 307/104 |
| 2002/0057584 | A1 | 5/2002 | Brockmann |
| 2004/0104799 | A1 | 6/2004 | Haisch |
| 2007/0024238 | A1 * | 2/2007 | Nakade et al. ................ 320/108 |
| 2008/0197712 | A1 | 8/2008 | Jin et al. |
| 2008/0197713 | A1 | 8/2008 | Jin |
| 2009/0009006 | A1 | 1/2009 | Jin et al. |
| 2009/0026844 | A1 | 1/2009 | Iisaka et al. |
| 2009/0127936 | A1 | 5/2009 | Kamijo et al. |

(Continued)

FOREIGN PATENT DOCUMENTS

EP  0923 182 A2  6/1999

(Continued)

*Primary Examiner* — Sanh D Phu
(74) *Attorney, Agent, or Firm* — Oliff & Berridge, PLC

(57) ABSTRACT

A power transmission control device provided in a power transmission device of a non-contact power transmission system includes a drive clock signal generation circuit that generates a drive clock signal that specifies a drive frequency of a primary coil, a driver control circuit that generates a driver control signal based on the drive clock signal and outputs the driver control signal to a transmission driver, a waveform adjusting circuit that outputs a waveform adjusting signal of an induced voltage signal of the primary coil, a pulse width detection circuit that receives the waveform adjusting signal and the drive clock signal and detects pulse width information relating to the waveform adjusting signal, and a control circuit that detects a change in secondary-side load based on the detected pulse width information.

17 Claims, 21 Drawing Sheets

U.S. PATENT DOCUMENTS

2009/0133942 A1  5/2009  Iisaka et al.

FOREIGN PATENT DOCUMENTS

| | | |
|---|---|---|
| EP | 1 432 097 A1 | 6/2004 |
| JP | A-05-300662 | 11/1993 |
| JP | A-09-103037 | 4/1997 |
| JP | A-10-260209 | 9/1998 |
| JP | A-11-341711 | 12/1999 |
| JP | A-2000-134830 | 5/2000 |
| JP | A-2000-295796 | 10/2000 |
| JP | A-2001-178027 | 6/2001 |
| JP | A-2002-199712 | 7/2002 |
| JP | A-2004-248365 | 9/2004 |
| JP | A 2006-60909 | 3/2006 |
| JP | A 2006-230032 | 8/2006 |
| WO | WO-A-99-49552 | 9/1999 |

* cited by examiner

FIG. 8A  NO-LOAD
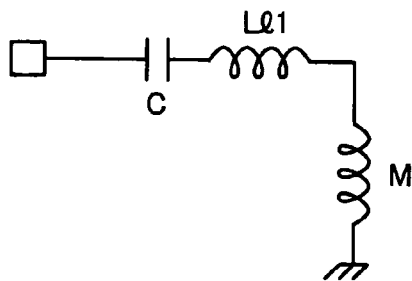
FIG. 8B  LOAD-CONNECTED
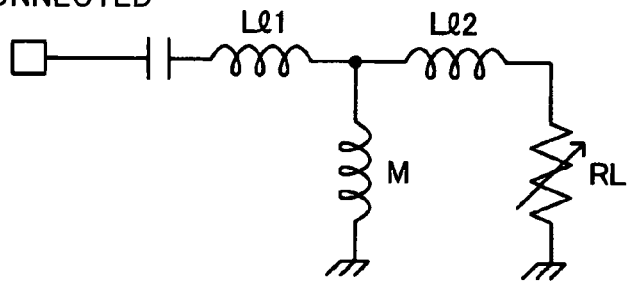
FIG. 8C
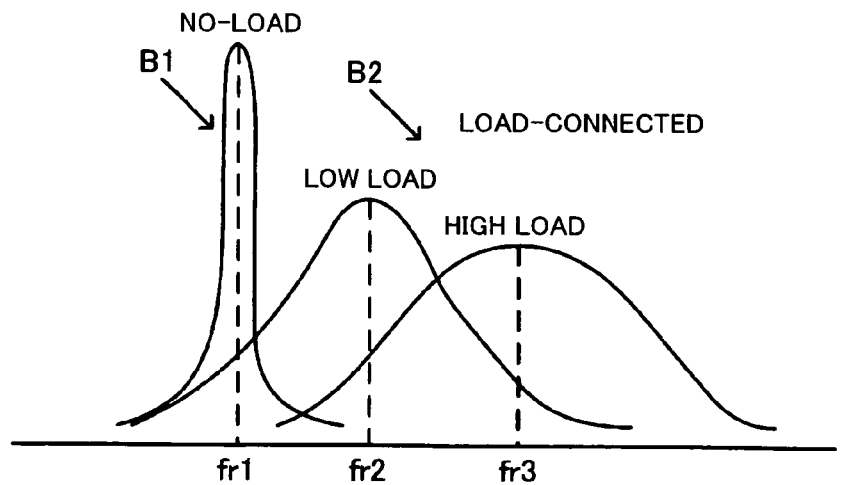

FIG. 16

THRESHOLD VALUE TABLE

| DETECTION TARGET | THRESHOLD VOLTAGE |
|---|---|
| DATA DETECTION | VSIGH=SIGHV−PV1 |
| OVERLOAD DETECTION | VOVER=SIGHV+PV2 |
| FOREIGN OBJECT DETECTION | VMETAL=SIGHV+PV3 |
| DETACHMENT DETECTION | VLEAVE=SIGHV−PV4 |

US 8,060,011 B2

POWER TRANSMISSION CONTROL DEVICE, POWER TRANSMISSION DEVICE, ELECTRONIC INSTRUMENT, AND NON-CONTACT POWER TRANSMISSION SYSTEM

Japanese Patent Application No. 2007-39548 filed on Feb. 20, 2007 and Japanese Patent Application No. 2007-323197 filed on Dec. 14, 2007, are hereby incorporated by reference in their entirety.

BACKGROUND OF THE INVENTION

The present invention relates to a power transmission control device, a power transmission device, an electronic instrument, a non-contact power transmission system, and the like.

In recent years, non-contact power transmission (contactless power transmission) which utilizes electromagnetic induction to enable power transmission without metal-to-metal contact has attracted attention. As application examples of non-contact power transmission, charging a portable telephone, a household appliance (e.g., telephone handset), and the like has been proposed.

JP-A-2006-60909 discloses related-art non-contact power transmission. JP-A-2006-60909 implements data transmission from a power reception device (secondary side) to a power transmission device (primary side) by means of load modulation. The power transmission device determines whether the data transmitted from the power reception device is "0" or "1" by detecting an induced voltage in a primary coil using a comparator or the like.

According to the technology disclosed in JP-A-2006-60909, the data transmitted from the power reception device is detected by comparing the peak voltage of the induced voltage with a given threshold voltage. However, the threshold voltage used to determine the detected voltage varies due to a variation in an element constant such as a power supply voltage or coil inductance. This makes it difficult to accurately detect a change in secondary-side load.

SUMMARY

According to one aspect of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information of the waveform adjusting signal; and a control circuit that detects a change of secondary-side load based on the pulse width information that has been detected.

According to another aspect of the invention, there is provided a power transmission device comprising:

the above power transmission control device; and a power transmission section that generates an alternating voltage and supplies the alternating voltage to the primary coil.

According to another aspect of the invention, there is provided an electronic instrument comprising the above power transmission device.

According to another aspect of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception device including:

a power reception section that converts an induced voltage in the secondary coil into a direct voltage; and a load modulation section that variably changes a load depending on transmission data when the power reception device transmits data to the power transmission device; and the power transmission device including:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information relating to the waveform adjusting signal; and a control circuit that detects a change in secondary-side load based on the pulse width information that has been detected.

According to another aspect of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information of the waveform adjusting signal; and a control circuit that controls the power transmission control device based on the pulse width information that has been detected.

According to another aspect of the invention, there is provided a power transmission device comprising:

the above power transmission control device; and a power transmission section that generates an alternating voltage and supplies the alternating voltage to the primary coil.

According to another aspect of the invention, there is provided an electronic instrument comprising the above power transmission device.

According to another aspect of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power transmission device being the above power transmission device.

BRIEF DESCRIPTION OF THE SEVERAL VIEWS OF THE DRAWING

FIGS. 8A to 8C show equivalent circuits and a resonance characteristic diagram in a no-load state and a load-connected state.

FIG. 16 shows an example of a threshold value table.

DETAILED DESCRIPTION OF THE EMBODIMENT

Figure 1A:
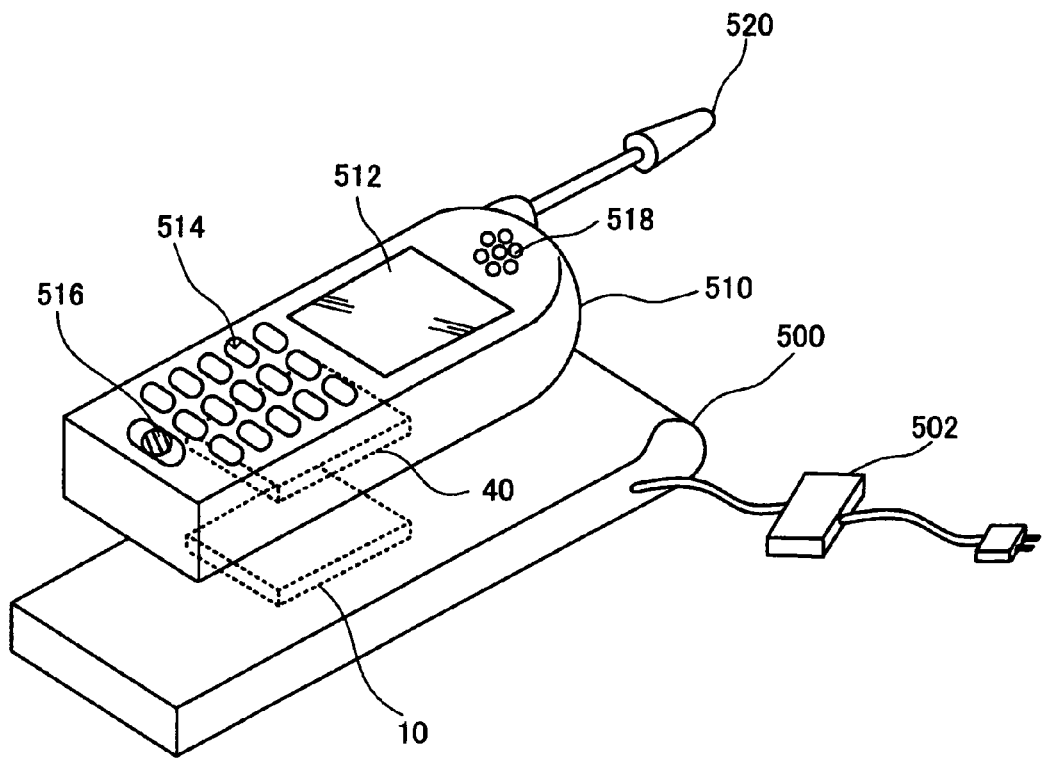
FIGS. 1A and 1B are views illustrative of non-contact power transmission.

Some aspects of the invention may provide a power transmission control device, a power transmission device, an electronic instrument, a non-contact power transmission system which can accurately detect a change in secondary-side load.

According to one embodiment of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information relating to the waveform adjusting signal; and a control circuit that detects a change of secondary-side load based on the pulse width information that has been detected.

According to this embodiment, the pulse width detection circuit receives the waveform adjusting signal of the induced voltage signal of the primary coil and the drive clock signal that specifies the drive frequency (alternating-current frequency) of the primary coil, and detects the pulse width information. A change in secondary-side load is detected based on the pulse width information. According to this configuration, a change in secondary-side load can be stably detected using a digital circuit process by performing a simple analog waveform adjusting process on the voltage waveform without employing a method in which a voltage and a current are individually detected and determination is made based on the phase difference. Therefore, a change in secondary-side load can be appropriately detected using a simple configuration.

In the power transmission control device, the control circuit may detect data that has been transmitted from the power reception device by means of load modulation based on the detected pulse width information that has been detected.

This enables the data transmitted from the power reception device to be appropriately detected based on the pulse width information, whereby a stable data transfer with the power reception device can be implemented.

In the power transmission control device, the pulse width detection circuit may detect the pulse width information by measuring a pulse width period, the pulse width period being a period from a first point when the drive clock signal changes from an inactive voltage level to an active voltage level to a second point when the waveform adjusting signal changes from an active voltage level to an inactive voltage level.

According to this configuration, the pulse width information can be detected by merely measuring the pulse width period between the first point and the second point, whereby a change in secondary-side load can be detected using a simple configuration.

In the power transmission control device, the pulse width detection circuit may include a counter that increments or decrements a count value during the pulse width period and measures the pulse width period based on the count value.

This enables the pulse width period to be digitally and accurately measured based on the counter.

In the power transmission control device, the pulse width detection circuit may include an enable signal generation circuit that receives the waveform adjusting signal and the drive clock signal and generates an enable signal that becomes active in the pulse width period; and the counter may increment or decrement the count value when the enable signal is active.

This enables the count process which counts the pulse width period to be controlled by merely generating the enable signal, so that the process can be simplified.

In the power transmission control device, the enable signal generation circuit may include a flip-flop circuit that is reset or set when the waveform adjusting signal is active, the drive clock signal being input to a clock signal terminal of the flip-flop circuit and a high-potential-side power supply voltage or a low-potential-side power supply voltage being input to a data terminal of the flip-flop circuit.

This enables the enable signal to be generated using a simple configuration which merely provides the flip-flop circuit.

In the power transmission control device, the waveform adjusting circuit may include a comparator, the induced voltage signal of the primary coil being input to a non-inverting input terminal of the comparator and a given set voltage being input to an inverting input terminal of the comparator.

According to this configuration, the load change detection accuracy can be increased by controlling the set voltage input to the inverting input terminal of the comparator. The change timing of the waveform adjusting signal may be delayed with respect to the change timing of the drive clock signal when using such a comparator. However, since the count process is also performed in the delay period by using the above flip-flop circuit, an accurate count value can be obtained.

In the power transmission control device, the pulse width detection circuit may include:

a count value holding circuit that holds the count value from the counter; and an output circuit that compares a first count value with a second count value, the first count value being the count value that has been currently held by the count value holding circuit, the second count value being the count value that has been previously held by the count value holding circuit, and outputs a larger count value among the first count value and the second count value.

This suppresses a change in pulse width period due to noise or the like, whereby stable pulse width detection can be implemented. Moreover, the pulse width detection method can be easily combined with the amplitude detection method.

In the power transmission control device, the pulse width detection circuit may include:

a count value holding circuit that holds the count value from the counter; and an output circuit that outputs an average value of a plurality of count values that have been held by the count value holding circuit.

This also suppresses a change in pulse width period due to noise or the like, whereby stable pulse width detection can be implemented.

In the power transmission control device, the power transmission control device may further include:

an amplitude detection circuit that detects amplitude information relating to the induced voltage signal of the primary coil;

an A/D conversion circuit that performs A/D conversion of the amplitude information;

a first latch circuit that latches data from the A/D conversion circuit; and a second latch circuit that latches data from the pulse width detection circuit, the second latch circuit may latch the data from the pulse width detection circuit at a timing synchronized with a latch timing of the first latch circuit.

This enables the data obtained by pulse width detection and the data obtained by amplitude detection to be latched at the same timing. Therefore, circuit compatibility can be maintained between pulse width detection and amplitude detection, whereby the sequence process and the determination process of the control circuit can be simplified.

According to another embodiment of the invention, there is provided a power transmission device comprising:

one of the above power transmission control devices; and a power transmission section that generates an alternating voltage and supplies the alternating voltage to the primary coil.

According to another embodiment of the invention, there is provided an electronic instrument comprising the above power transmission device.

According to another embodiment of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception device including:

a power reception section that converts an induced voltage in the secondary coil into a direct voltage; and a load modulation section that variably changes a load depending on transmission data when the power reception device transmits data to the power transmission device; and the power transmission device including:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information of the waveform adjusting signal; and a control circuit that detects a change in secondary-side load based on the pulse width information that has been detected.

According to another embodiment of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information relating to the waveform adjusting signal; and a control circuit that controls the power transmission control device based on the pulse width information that has been detected.

According to another embodiment of the invention, there is provided a power transmission device comprising:

the above power transmission control device; and a power transmission section that generates an alternating voltage and supplies the alternating voltage to the primary coil.

According to another embodiment of the invention, there is provided an electronic instrument comprising the above power transmission device.

According to another embodiment of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power transmission device being the above power transmission device.

Preferred embodiments of the invention are described in detail below. Note that the embodiments described below do not in any way limit the scope of the invention defined by the claims laid out herein. Note that all elements of the embodiments described below should not necessarily be taken as essential requirements for the invention.

1. Electronic Instrument

FIG. 1A shows examples of an electronic instrument to which a non-contact power transmission method according to one embodiment of the invention is applied. A charger 500 (cradle) (i.e., electronic instrument) includes a power transmission device 10. A portable telephone 510 (i.e., electronic instrument) includes a power reception device 40. The portable telephone 510 also includes a display section 512 such as an LCD, an operation section 514 which includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

The electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

Figure 1B:
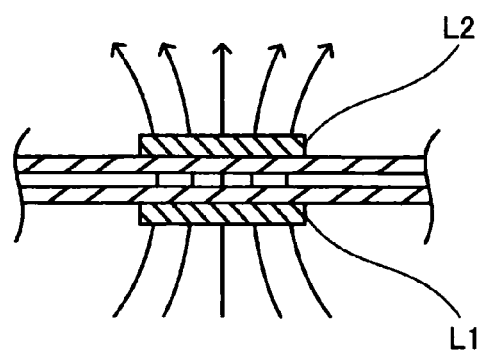

As schematically shown in FIG. 1B, power transmission from the power transmission device 10 to the power reception device 40 is implemented by electromagnetically coupling a primary coil L1 (transmitting coil) provided in the power transmission device 10 and a secondary coil L2 (receiving coil) provided in the power reception device 40 to form a power transmission transformer. This enables non-contact power transmission.

2. Power Transmission Device and Power Reception Device

Figure 2:
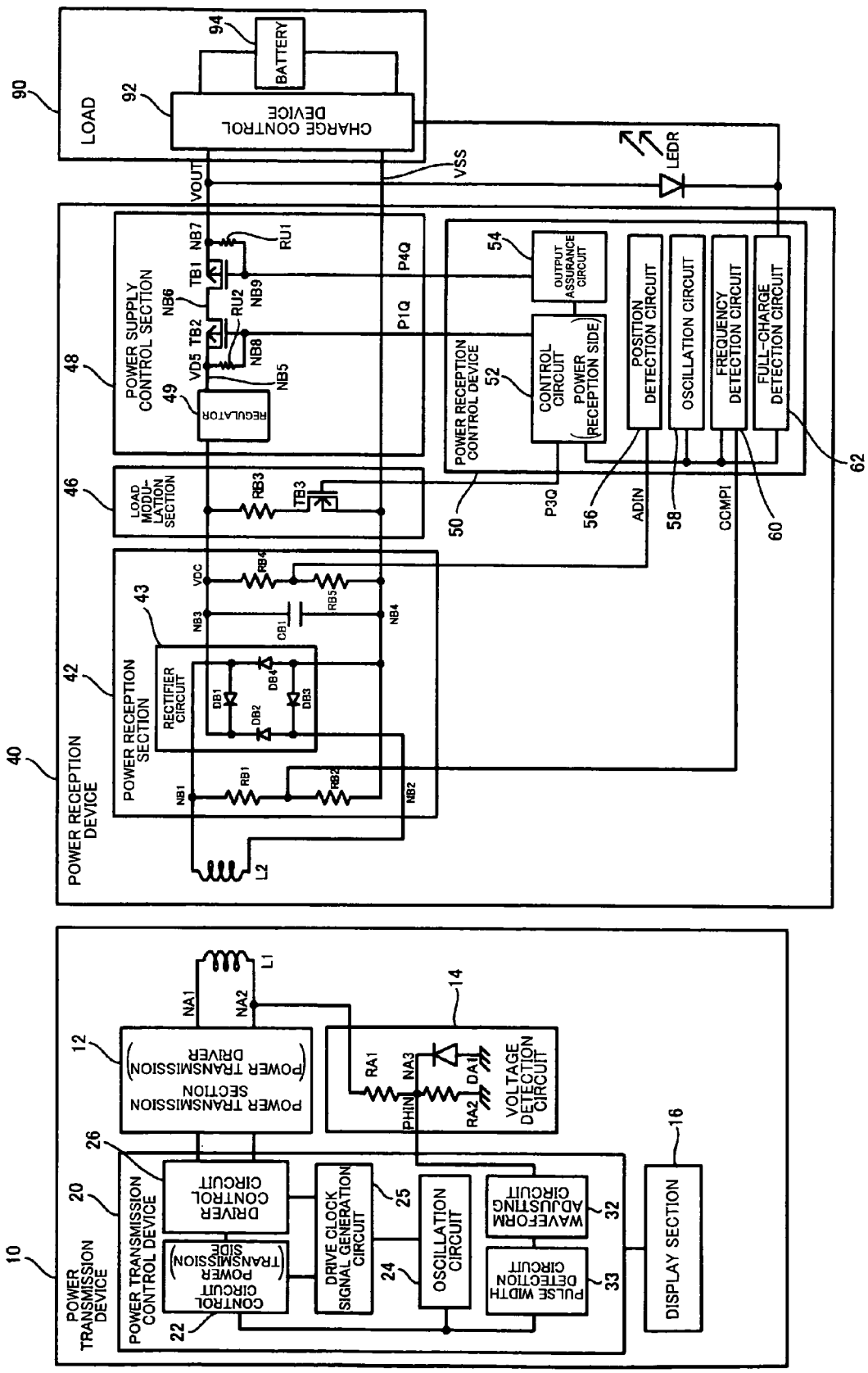
FIG. 2 shows a configuration example of a power transmission device, a power transmission control device, a power reception device, and a power reception control device according to one embodiment of the invention.

FIG. 2 shows a configuration example of a power transmission device 10, a power transmission control device 20, a power reception device 40, and a power reception control device 50 according to this embodiment. A power-transmission-side electronic instrument such as the charger 500 shown in FIG. 1A includes at least the power transmission device 10 shown in FIG. 2. A power-reception-side electronic instrument such as the portable telephone 510 includes at least the power reception device 40 and a load 90 (actual load). The configuration shown in FIG. 2 implements a non-contact power transmission (contactless power transmission) system in which power is transmitted from the power transmission device 10 to the power reception device 40 by electromagnetically coupling the primary coil L1 and the secondary coil L2 and power (voltage VOUT) is supplied to the load 90 from a voltage output node NB7 of the power reception device 40.

The power transmission device 10 (power transmission module or primary module) may include the primary coil L1, a power transmission section 12, a voltage detection circuit 14, a display section 16, and the power transmission control device 20. The power transmission device 10 and the power transmission control device 20 are not limited to the configuration shown in FIG. 2. Various modifications may be made such as omitting some elements (e.g., display section and voltage detection circuit), adding other elements, or changing the connection relationship.

Figure 3A:
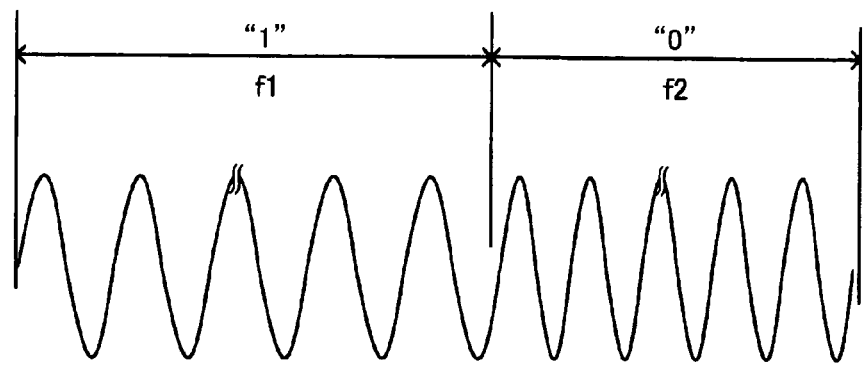
FIGS. 3A and 3B are views illustrative of data transmission by means of frequency modulation and load modulation.

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1. As shown in FIG. 3A, the power transmission section 12 generates an alternating-current voltage at a frequency f1 when transmitting data "1" to the power reception device 40, and generates an alternating-current voltage at a frequency f2 when transmitting data "0" to the power reception device 40, for example. The power transmission section 12 may include a first power transmission driver which drives one end of the primary coil L1, a second power transmission driver which drives the other end of the primary coil L1, and at least one capacitor which forms a resonant circuit together with the primary coil L1.

Each of the first and second power transmission drivers included in the power transmission section 12 is an inverter circuit (buffer circuit) which includes a power MOS transistor, for example, and is controlled by a driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B. When power transmission is unnecessary, the charger 500 and the portable telephone 510 are physically separated so that a magnetic flux of the primary coil L1 does not pass through the secondary coil L2.

The voltage detection circuit 14 is a circuit which detects the induced voltage in the primary coil L1. The voltage detection circuit 14 includes resistors RA1 and RA2 and a diode DA1 provided between a connection node NA3 of the resistors RA1 and RA2 and GND (low-potential-side power supply in a broad sense), for example.

The voltage detection circuit 14 functions as a half-wave rectifier circuit for a coil end voltage signal of the primary coil L1. A signal PHIN (induced voltage signal or half-wave rectified signal) obtained by dividing the coil end voltage of the primary coil L1 using the resistors RA1 and RA2 is input to a waveform adjusting (shaping) circuit 32 of the power transmission control device 20. Specifically, the resistors RA1 and RA2 form a voltage divider circuit (resistor divider circuit), and the signal PHIN is output from the voltage division node NA3 of the resistors RA1 and RA2.

The display section 16 displays the state (e.g., power transmission or ID authentication) of the non-contact power transmission system using a color, an image, or the like. The display section 16 is implemented by an LED, an LCD, or the like.

The power transmission control device 20 is a device which controls the power transmission device 10. The power transmission control device 20 may be implemented by an integrated circuit device (IC) or the like. The power transmission control device 20 may include a control circuit 22 (power transmission side), an oscillation circuit 24, a drive clock signal generation circuit 25, a driver control circuit 26, the waveform adjusting circuit 32, and a pulse width detection circuit 33.

The control circuit 22 (control section) controls the power transmission device 10 and the power transmission control device 20. The control circuit 22 may be implemented by a gate array, a microcomputer, or the like. Specifically, the control circuit 22 performs sequence control and a determination process necessary for power transmission, load detection, frequency modulation, foreign object detection, detachment detection, and the like.

The oscillation circuit 24 includes a crystal oscillation circuit, for example. The oscillation circuit 24 generates a primary-side clock signal. The drive clock signal generation circuit 25 generates a drive clock signal which specifies a drive frequency. The driver control circuit 26 generates a control signal at a desired frequency based on the drive clock signal, a frequency setting signal from the control circuit 22, and the like, and outputs the generated control signal to the first and second power transmission drivers of the power transmission section 12 to control the first and second power transmission drivers.

The waveform adjusting circuit 32 adjusts the waveform of the induced voltage signal PHIN (coil end voltage) of the primary coil L1, and outputs a waveform adjusting signal. Specifically, the waveform adjusting circuit 32 outputs the square wave (rectangular wave) waveform adjusting signal which becomes active (e.g., H level) when the signal PHIN has exceeded a given threshold voltage, for example.

The pulse width detection circuit 33 detects pulse width information (i.e., pulse width period in which the coil end voltage waveform is equal to or higher than given setting voltage) relating to the induced voltage signal PHIN of the primary coil L1. Specifically, the pulse width detection circuit 33 receives the waveform adjusting signal from the waveform adjusting circuit 32 and the drive clock signal from the drive clock signal generation circuit 25, and detects pulse width information relating to the waveform adjusting signal to detect the pulse width information relating to the induced voltage signal PHIN.

The control circuit 22 controls the power transmission control device 20 based on the pulse width information detected by the pulse width detection circuit 33. For example, the control circuit 22 detects a change (degree of load) in the secondary-side load (load of the power reception device 40) based on the pulse width information. Specifically, the control circuit 22 performs data (load) detection, foreign object (metal) detection, detachment (removal) detection, and the like. The pulse width period which is the pulse width information relating to the induced voltage signal changes depending on the secondary-side load. The control circuit 22 detects a change in secondary-side load based on the pulse width period (i.e., count value obtained by measuring the pulse width period). Therefore, when the load modulation section 46 of the power reception device 40 has transmitted data by means of load modulation (see FIG. 3B), the transmitted data can be detected.

The power reception device 40 (power reception module or secondary module) may include the secondary coil L2, a power reception section 42, the load modulation section 46, a power supply control section 48, and a power reception control device 50. The power reception device 40 and the power reception control device 50 are not limited to the configuration shown in FIG. 2. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a direct-current voltage VDC generation node NB3, the diode DB2 is provided between the node NB3 and a node NB2 at the other end of the secondary coil L2, the diode DB3 is provided between the node NB2 and a node NB4 (VSS), and the diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal ADIN obtained by dividing the voltage between the nodes NB3 and NB4 using the resistors RB4 and RB5 is input to a position detection circuit 56 of the power reception control device 50.

Figure 3B:
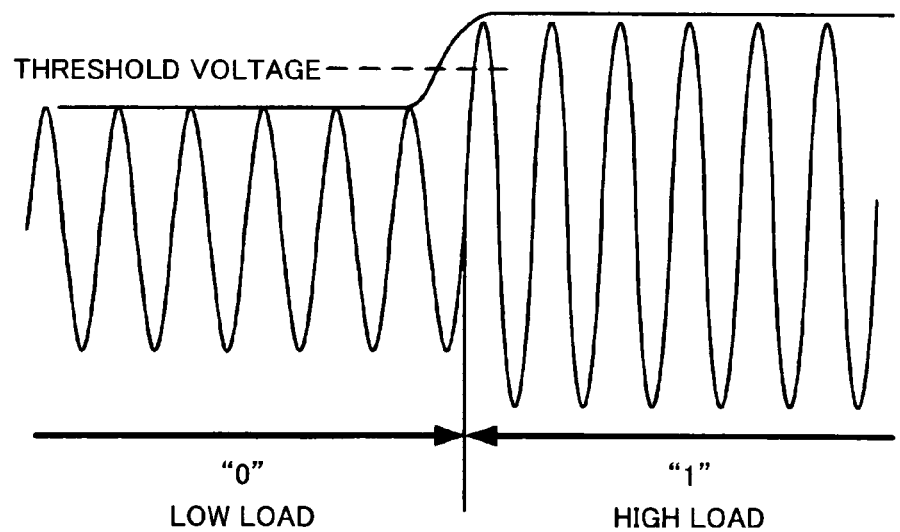

The load modulation section 46 performs a load modulation process. Specifically, when the power reception device 40 transmits desired data to the power transmission device 10, the load modulation section 46 variably changes the load of the load modulation section 46 (secondary side) depending on transmission data to change the signal waveform of the induced voltage in the primary coil L1 as shown in FIG. 3B. The load modulation section 46 includes a resistor RB3 and a transistor TB3 (N-type CMOS transistor) provided in series between the nodes NB3 and NB4. The transistor TB3 is ON/OFF-controlled based on a signal P3Q from a control circuit 52 of the power reception control device 50. When performing load modulation by ON/OFF-controlling the transistor TB3, transistors TB1 and TB2 of the power supply control section 48 are turned OFF so that the load 90 is not electrically connected to the power reception device 40.

For example, when reducing the secondary-side load (high impedance) in order to transmit data "0", as shown in FIG. 3B, the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 becomes the resistor RB3 (high load).

The power supply control section 48 controls power supplied to the load 90. A regulator 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A transistor TB2 (P-type CMOS transistor) is controlled based on a signal P1Q from the control circuit 52 of the power reception control device 50. Specifically, the transistor TB2 is turned ON when ID authentication has been completed (established) and normal power transmission is performed, and is turned OFF during load modulation or the like.

A transistor TB1 (P-type CMOS transistor) is controlled based on a signal P4Q from an output assurance circuit 54. Specifically, the transistor TB1 is turned ON when ID authentication has been completed and normal power transmission is performed. The transistor TB1 is turned OFF when connection of an AC adaptor has been detected or the power supply voltage VD5 is lower than the operation lower limit voltage of the power reception control device 50 (control circuit 52), for example.

The power reception control device 50 is a device which controls the power reception device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the control circuit 52 (power reception side), the output assurance circuit 54, the position detection circuit 56, an oscillation circuit 58, the frequency detection circuit 60, and a full-charge detection circuit 62.

The control circuit 52 (control section) controls the power reception device 40 and the power reception control device 50. The control circuit 52 may be implemented by a gate array, a microcomputer, or the like. Specifically, the control circuit 22 performs sequence control and a determination process necessary for ID authentication, position detection, frequency detection, load modulation, full-charge detection, and the like.

The output assurance circuit 54 is a circuit which assures the output from the power reception device 40 when the voltage is low (0 V). The output assurance circuit 54 prevents a backward current flow from the voltage output node NB7 to the power reception device 40.

The position detection circuit 56 monitors the waveform of the signal ADIN which corresponds to the waveform of the induced voltage in the secondary coil L2, and determines whether or not the positional relationship between the primary coil L1 and the secondary coil L2 is appropriate. Specifically, the position detection circuit 56 converts the signal ADIN into a binary value using a comparator or determines the level of the signal ADIN by A/D conversion, and determines whether or not the positional relationship between the primary coil L1 and the secondary coil L2 is appropriate.

The oscillation circuit 58 includes a CR oscillation circuit, for example. The oscillation circuit 58 generates a secondary-side clock signal. The frequency detection circuit 60 detects the frequency (f1 or f2) of the signal CCMPI, and determines whether the data transmitted from the power transmission device 10 is "1" or "0", as shown in FIG. 3A.

The full-charge detection circuit 62 (charge detection circuit) is a circuit which detects whether or not a battery 94 (secondary battery) of the load 90 has been fully charged (completely charged).

The load 90 includes a charge control device 92 which controls charging of the battery 94 and the like. The charge control device 92 (charge control IC) may be implemented by an integrated circuit device or the like. The battery 94 may be provided with the function of the charge control device 92 (e.g., smart battery).

Figure 4:
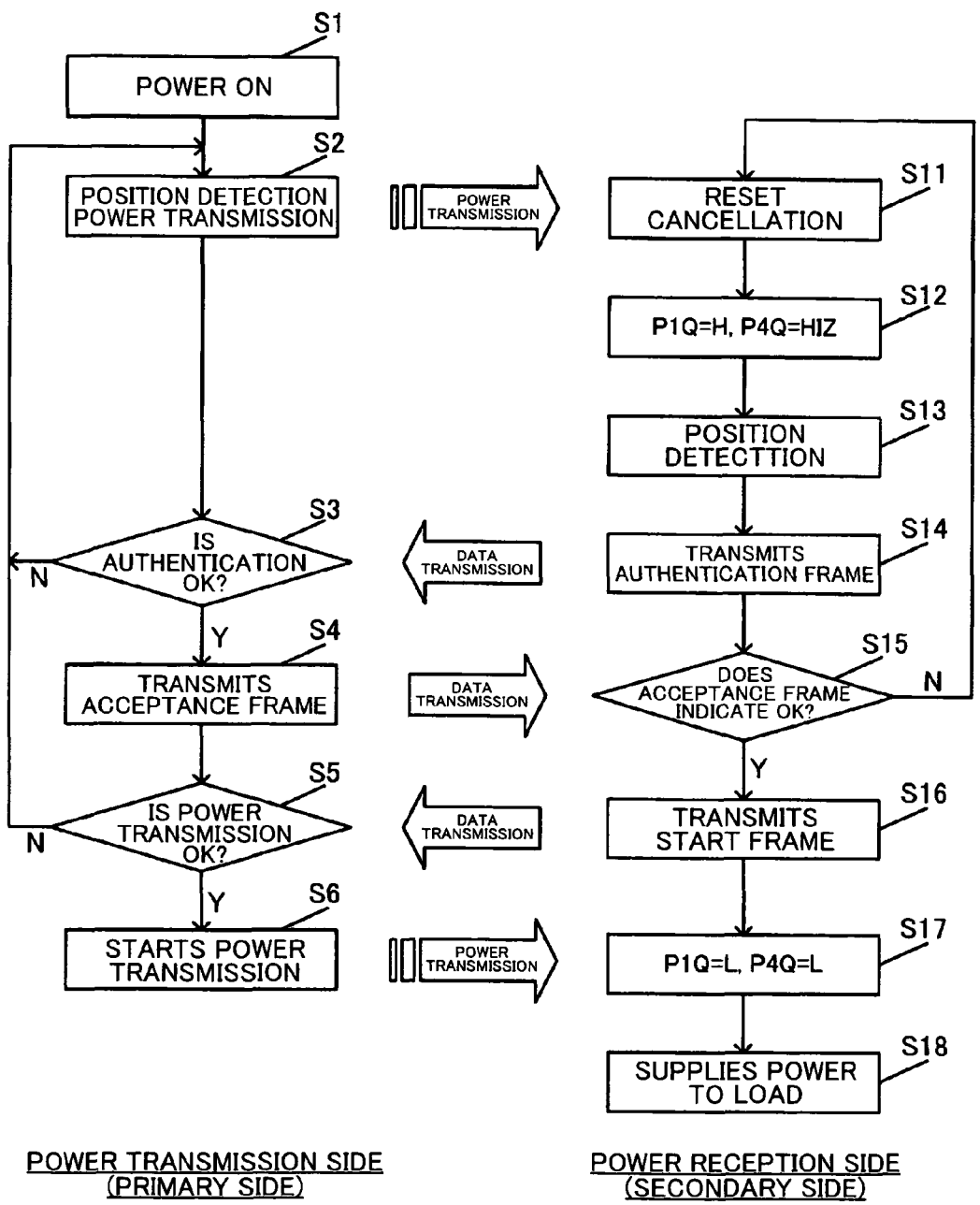
FIG. 4 shows a flowchart illustrative of an outline of a power-transmission-side operation and a power-reception-side operation.

An outline of the power-transmission-side operation and the power-reception-side operation is described below using a flowchart shown in FIG. 4. When power is supplied to the power-transmission-side instrument (step S1), the power-transmission-side instrument performs temporary position detection power transmission (step S2). The power-reception-side power supply voltage rises due to power transmission so that the reset state of the power reception control device 50 is canceled (step S11). The power-reception-side instrument sets the signal P1Q at the H level, and sets the signal P4Q in a high impedance state (step S12). This causes the transistors TB2 and TB1 to be turned OFF so that the load 90 is electrically disconnected from the power reception device 40.

The power-reception-side instrument determines whether or not the positional relationship between the primary coil L1 and the secondary coil L2 is appropriate using the position detection circuit 56 (step S13). When the power-reception-side instrument has determined that the positional relationship between the primary coil L1 and the secondary coil L2 is appropriate, the power-reception-side instrument starts an ID authentication process and transmits an authentication frame to the power-transmission-side instrument (step S14). Specifically, the power-reception-side instrument transmits data relating to the authentication frame by means of load modulation described with reference to FIG. 3B.

When the power-transmission-side instrument has received the authentication frame, the power-transmission-side instrument performs the determination process relating to the ID or the like (step S3). When the power-transmission-side instrument accepts the ID authentication, the power-transmission-side instrument transmits an acceptance frame to the power-reception-side instrument (step S4). Specifically, the power-transmission-side instrument transmits data by frequency modulation described with reference to FIG. 3A.

The power-reception-side instrument receives the acceptance frame. When the acceptance frame indicates OK, the power-reception-side instrument transmits a start frame for starting non-contact power transmission to the power-transmission-side instrument (steps S15 and S16). The power-transmission-side instrument receives the start frame. When the start frame indicates OK, the power-transmission-side instrument starts normal power transmission (steps S5 and S6). The power-reception-side instrument sets the signals P1Q and P4Q at the L level (step S17). This causes the transistors TB2 and TB1 to be turned ON so that power can be transmitted to the load 90. As a result, power is supplied to the load (voltage VOUT is output) (step S18).

3. Pulse Width Detection

Figure 5:
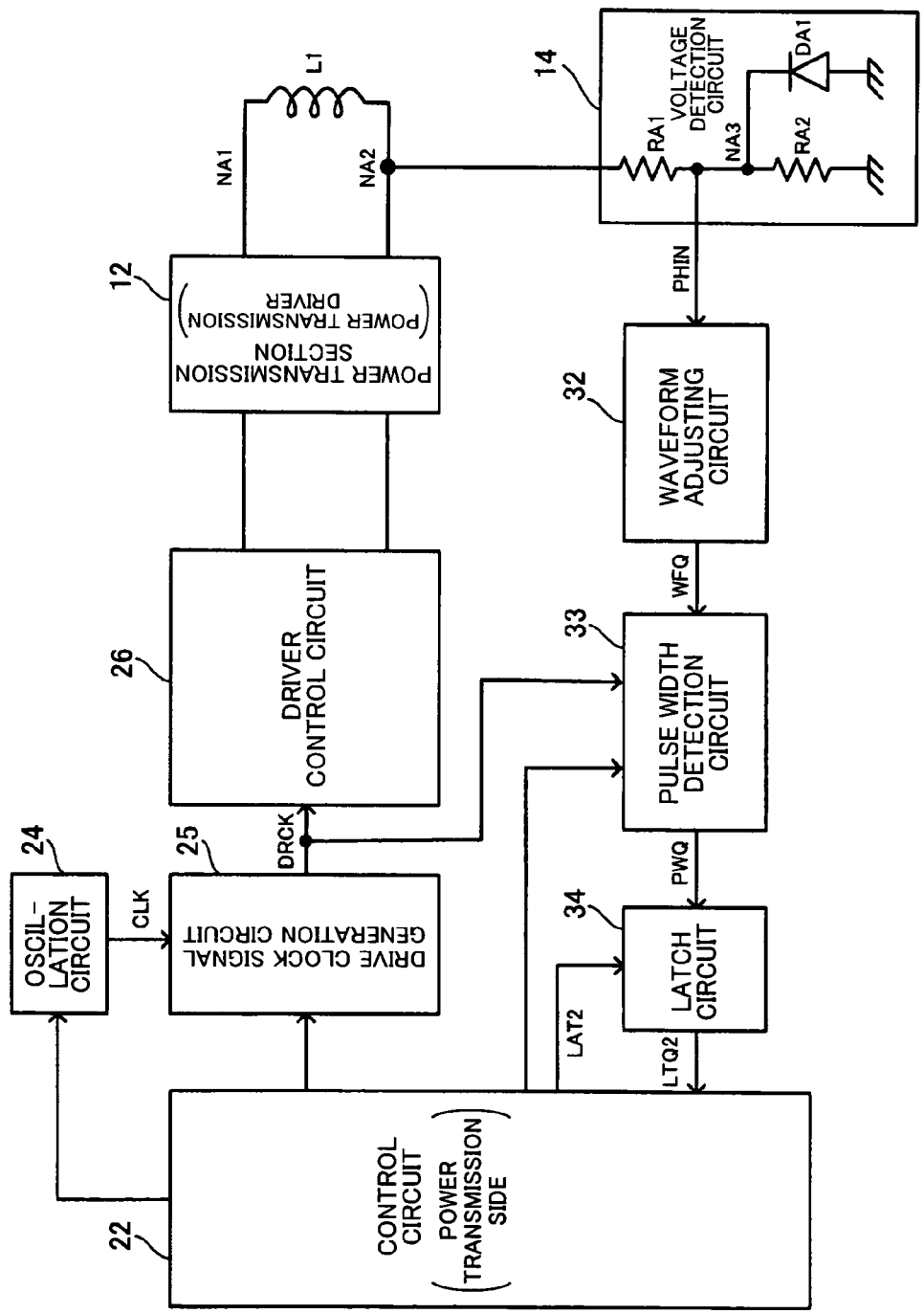
FIG. 5 shows a configuration example of a power transmission control device according to one embodiment of the invention.

FIG. 5 shows a specific configuration example of the power transmission control device 20 according to this embodiment. The power transmission control device 20 according to this embodiment is not limited to the configuration shown in FIG. 5. Various modifications may be made such as omitting some elements (e.g., latch circuit, voltage detection circuit, or waveform adjusting circuit), adding other elements, or changing the connection relationship.

In FIG. 5, when the inductance of the primary coil L1, the capacitance of the capacitor which forms the resonant circuit, the power supply voltage, or the like changes, the peak voltage (amplitude) of the induced voltage signal PHIN also changes. Therefore, a change in load may not be accurate detected using only the method of detecting the peak voltage of the signal PHIN. In FIG. 5, a change in load is detected by detecting the pulse width information relating to the induced voltage signal PHIN.

The waveform adjusting circuit 32 adjusts the waveform of the induced voltage signal PHIN (coil end voltage) of the primary coil L1, and outputs a waveform adjusting signal WFQ. Specifically, the waveform adjusting circuit 32 outputs the square wave (rectangular wave) waveform adjusting signal WFQ which becomes active (e.g., H level) when the signal PHIN has exceeded a given threshold voltage, for example.

The drive clock signal generation circuit 25 generates a drive clock signal DRCK which specifies the drive frequency of the primary coil L1. Specifically, the drive clock signal generation circuit 25 generates the drive clock signal DRCK by dividing the frequency of a reference clock signal CLK generated by the oscillation circuit 24. An alternating-current voltage at a drive frequency specified by the drive clock signal DRCK is supplied to the primary coil L1.

The driver control circuit 26 generates a driver control signal based on the drive clock signal DRCK, and outputs the driver control signal to the power transmission drivers (first and second power transmission drivers) of the power transmission section 12 which drives the primary coil L1. In this case, in order to prevent a shoot-through current from flowing through the inverter circuit of the power transmission driver, the driver control circuit 26 generates the driver control signal so that a signal input to the gate of a P-type transistor of the inverter circuit does not overlap a signal input to the gate of an N-type transistor of the inverter circuit.

The pulse width detection circuit 33 detects pulse width information relating to the induced voltage signal PHIN of the primary coil L1. Specifically, the pulse width detection circuit 33 receives the waveform adjusting signal WFQ from the waveform adjusting circuit 32 and the drive clock signal DRCK (drive control signal) from the drive clock signal generation circuit 25, and detects pulse width information relating to the waveform adjusting signal WFQ to detect the pulse width information relating to the induced voltage signal PHIN.

More specifically, the pulse width detection circuit 33 detects the pulse width information by measuring a pulse width period which is a period from a first point (e.g., rising edge or drive start point) at which the drive clock signal DRCK (drive control signal) changes from an inactive voltage level (e.g., L level) to an active voltage level (e.g., H level) to a second point (e.g., falling edge or end point of waveform adjusting signal) at which the waveform adjusting signal WFQ changes from an active voltage level (e.g., H level) to an inactive voltage level (e.g., L level). For example, the pulse width detection circuit 33 measures the pulse width period in which the voltage signal PHIN induced by a change in voltage of the drive clock signal DRCK becomes equal to or higher than a given threshold voltage. The pulse width detection circuit 33 measures the pulse width of the waveform adjusting signal WFQ (induced voltage signal) with respect to the pulse width of the drive clock signal DRCK. In this case, the pulse width detection circuit 33 measures the pulse width period using the reference clock signal CLK, for example. The latch circuit 34 latches measurement result data PWQ output from the pulse width detection circuit 33. Specifically, the pulse width detection circuit 33 measures the pulse width period using a counter which increments (or decrements) the count value based on the reference clock signal CLK, and the latch circuit 34 latches the measurement result data PWQ.

The control circuit 22 detects a change in the secondary-side (power reception device 40) load (degree of load) based on the pulse width information detected by the pulse width detection circuit 33. Specifically, the control circuit 22 detects data transmitted from the power reception device 40 by means of load modulation based on the pulse width information detected by the pulse width detection circuit 33. The control circuit 22 may perform overload detection such as foreign object detection or detachment detection.

Figure 6A:
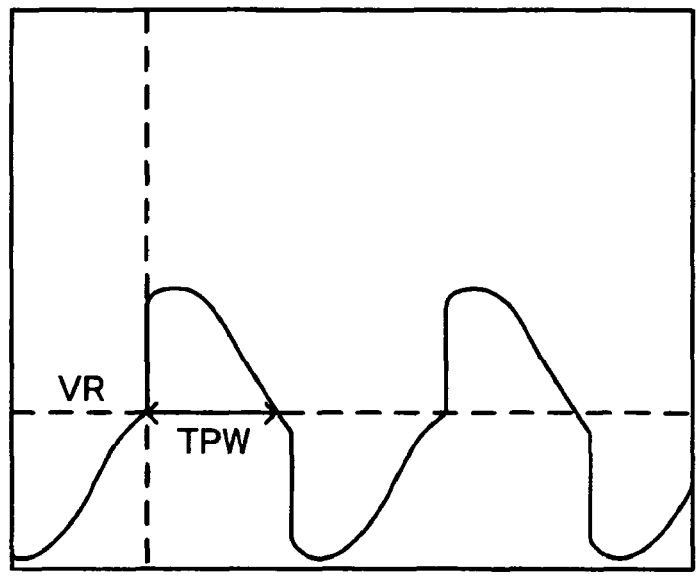
FIGS. 6A and 6B are views showing coil end voltage waveform measurement results.
Figure 6B:
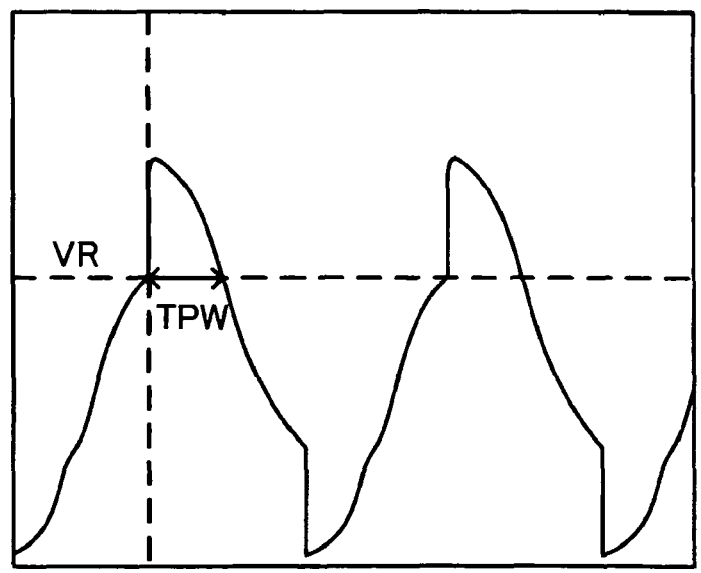

FIGS. 6A and 6B show measurement results for the coil end voltage waveform of the primary coil L1. FIGS. 6A and 6B show voltage waveforms when the power-reception-side load current is 150 mA and 300 mA, respectively A pulse width period TPW in which the coil end voltage is equal to or higher than a given set voltage VR decreases as the load current increases (as the load increases). Therefore, the degree of the load in the load modulation section 46 of the power reception device 40 can be determined by measuring the pulse width period TPW, so that whether the data transmitted from the power-reception-side instrument is "0" or "1" can be determined. Suppose that the low-load is specified as "0" and the high-load is specified as "1", as shown in FIG. 3B, for example. In this case, when the pulse width period TPW is longer than a given reference pulse width period (i.e., low load), the data transmitted from the power-reception-side instrument can be determined to be "0". When the pulse width period TPW is shorter than a given reference pulse width period (i.e., high load), the data transmitted from the power-reception-side instrument can be determined to be "1".

Figure 7:
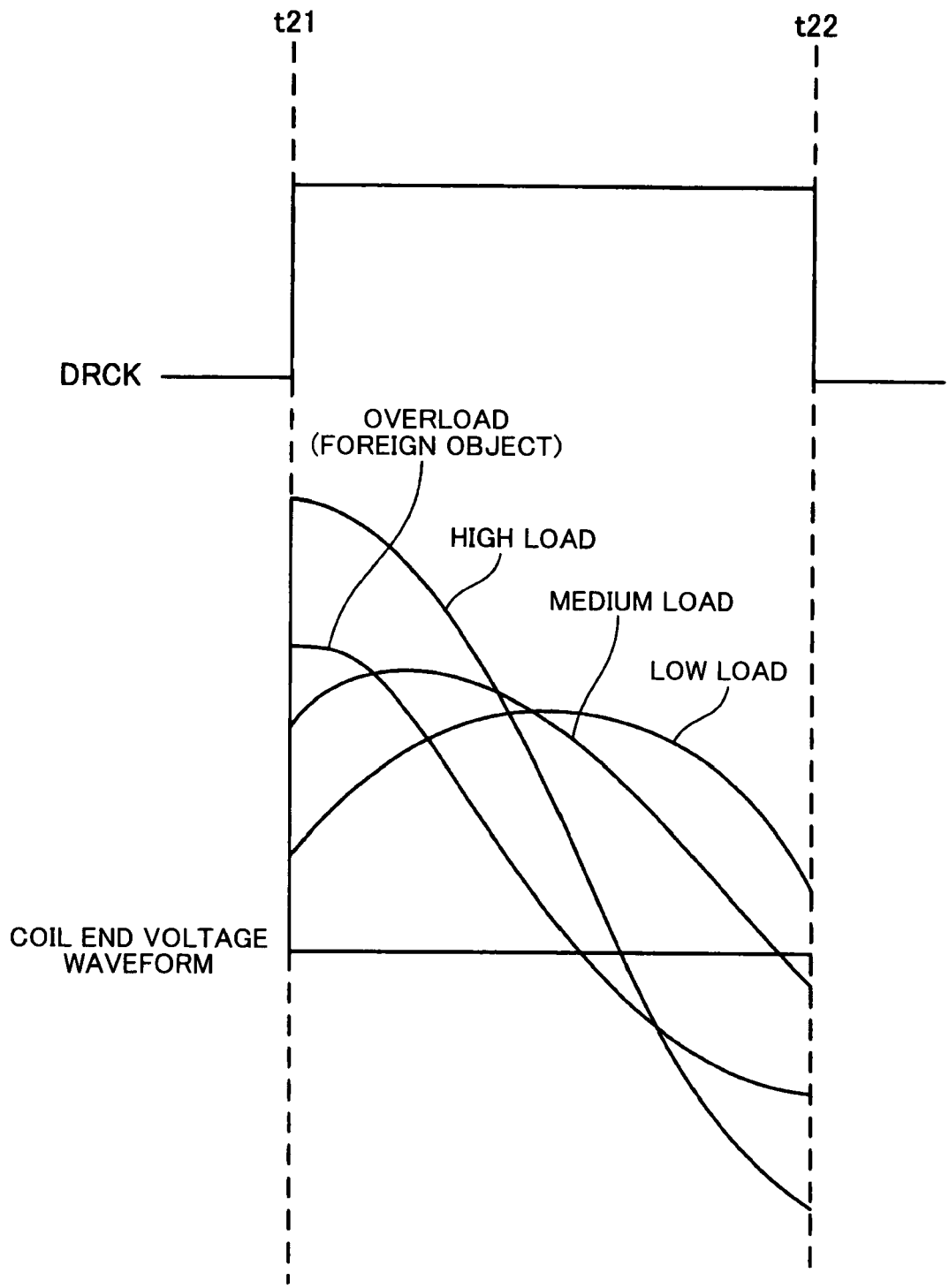
FIG. 7 is a schematic view showing the relationship between a drive clock signal and a coil end voltage waveform.

FIG. 7 schematically shows the relationship between the drive clock signal DRCK (drive control signal) and the coil end voltage waveform. The drive clock signal DRCK is set at the H level (active) at a timing t21, and is set at the L level (inactive) at a timing t22. The coil end voltage steeply increases at the timing t21 at which the drive clock signal DRCK is set at the H level, and then decreases. As shown in FIG. 7, the coil end voltage gradually increases as the power-reception-side load decreases. Therefore, the pulse width period in which the coil end voltage (induced voltage signal) is equal to or higher than a given set voltage increases as the power-reception-side load decreases. Therefore, whether the power-reception-side load state is a low load, a medium load, a high load, or an overload can be determined by measuring the pulse width period.

As the set voltage VR (e.g., voltage equal to or higher than 0 V; voltage equal to or higher than the threshold voltage of N-type transistor) used to measure the pulse width period, a voltage at which the load change detection accuracy is optimized may be appropriately selected.

FIG. 8A shows a primary-side equivalent circuit in a no-load state, and FIG. 8B shows a primary-side equivalent circuit in a load-connected state. As shown in FIG. 8A, a series resonant circuit is formed by a capacitance C, a primary-side leakage inductance L11, and a coupling inductance M. Therefore, the resonance characteristics in a no-load state have a sharp profile with a high Q value, as indicated by B1 in FIG. 8C. A secondary-side leakage inductance L12 and a resistance RL of the secondary-side load are added in a load-connected state. Therefore, resonance frequencies fr2 and fr3 in a load-connected state are higher than a resonance frequency fr1 in a no-load state, as shown in FIG. 8B. The resonance characteristics in a load-connected state have a gentle profile with a low Q value due to the effect of the resistance RL. The resonance frequency increases as the load increases from a low-load state (RL: high) to a high-load state (RL: low), and approaches the drive frequency of the coil (frequency of the drive clock signal DRCK).

When the resonance frequency approaches the drive frequency, a sine wave portion (resonance waveform) is gradually observed, as shown in FIGS. 6A and 6B. In the voltage waveform in a low-load state shown in FIG. 6A, a square wave (drive waveform) is predominant over a sine wave (resonance waveform). In the voltage waveform in a high-load state shown in FIG. 6B, a sine wave (resonance waveform) is predominant over a square wave (drive waveform). As a result, a pulse width period TPW in which the coil end voltage is equal to or higher than a set voltage VR decreases as the load increases. Therefore, a change (degree) in power-reception-side load can be determined by measuring the pulse width period TPW.

A method may be considered which determines a change in power-reception-side load based on phase characteristics due to load, for example. The term "phase characteristics due to load" refers to a voltage-current phase difference. This method complicates the circuit configuration, whereby cost increases.

When using the pulse width detection method according to this embodiment, since digital data processing can be achieved using a simple waveform adjusting circuit and a counter circuit (counter) utilizing the voltage waveform, the circuit configuration can be simplified. Moreover, the pulse width detection method according to this embodiment can be easily combined with the amplitude detection method which detects a change in load using the voltage waveform.

Figure 9:
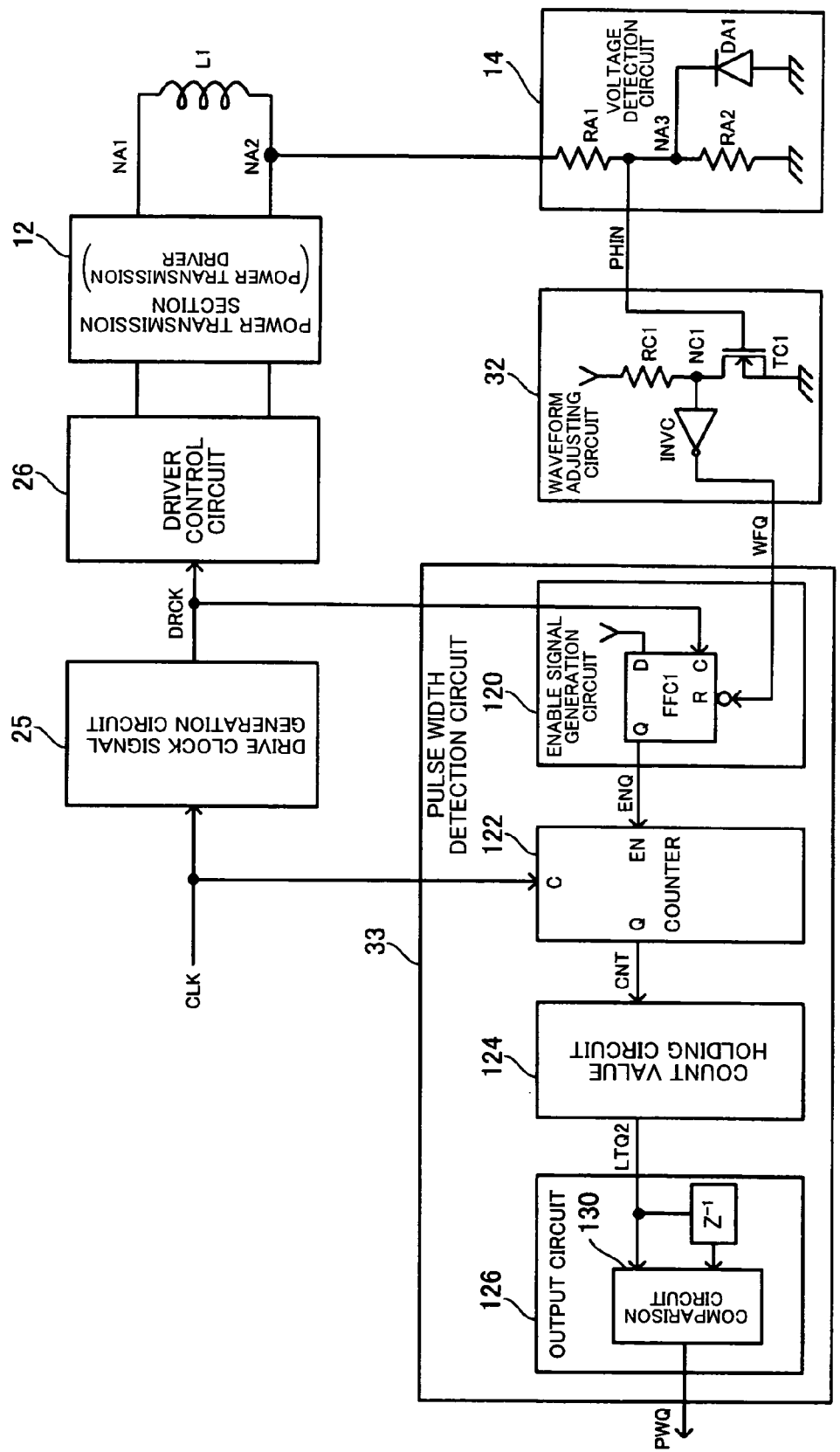
FIG. 9 shows a detailed configuration example of a power transmission control device.

FIG. 9 shows a specific configuration example of the power transmission control device 20 according to this embodiment. In FIG. 9, the waveform adjusting circuit 32 includes a resistor RC1 and an N-type transistor TC1 connected in series between the power supply VDD (high-potential-side power supply) and the power supply GND, and an inverter circuit INVC. The signal PHIN from the voltage detection circuit 14 is input to the gate of the transistor TC1. When the signal PHIN has become higher than the threshold voltage of the transistor TC1, the transistor TC1 is turned ON so that the voltage of a node NC1 is set at the L level. Therefore, the waveform adjusting signal WFQ is set at the H level. When the signal PHIN has become lower than the threshold voltage of the transistor TC1, the waveform adjusting signal WFQ is set at the L level.

The pulse width detection circuit 33 includes a counter 122. The counter 122 increments (or decrements) the count value in the pulse width period, and measures the pulse width period based on the resulting count value. In this case, the counter 122 counts the count value based on the reference clock signal CLK, for example.

More specifically, the pulse width detection circuit 33 includes an enable signal generation circuit 120. The enable signal generation circuit 120 receives the waveform adjusting signal WFQ and the drive clock signal DRCK, and generates an enable signal ENQ which becomes active in the pulse width period. The counter 122 increments (or decrements) the count value when the enable signal ENQ is active (e.g., H level).

The enable signal generation circuit 120 may be formed using a flip-flop circuit FFC1 to which the drive clock signal DRCK is input at a clock signal terminal and a voltage VDD (high-potential-side power supply voltage in a broad sense) is input at a data terminal and which is reset when the waveform adjusting signal WFQ is inactive (L level). When the waveform adjusting signal WFQ has become active (H level) and the drive clock signal DRCK then has become active (H level), the enable signal ENQ which is the output signal from the flip-flop circuit FFC1 becomes active (H level). When the waveform adjusting signal WFQ has become inactive (L level), the flip-flop circuit FFC1 is reset so that the enable signal ENQ which is the output signal from the flip-flop circuit FFC1 becomes inactive (L level). Therefore, the counter 122 can measure the pulse width period by counting the period in which the enable signal ENQ becomes active based on the reference clock signal CLK.

Note that the enable signal generation circuit 120 may be formed using a flip-flop circuit to which the drive clock signal DRCK is input at a clock signal terminal, of which a data terminal is connected to the power supply GND (low-potential-side power supply), and which is reset when the waveform adjusting signal WFQ is inactive. In this case, an inversion signal of the output signal from the flip-flop circuit may be input to the counter 122 as the enable signal ENQ.

A count value holding circuit 124 holds a count value CNT (pulse width information) from the counter 122. The count value holding circuit 124 outputs data LTQ2 relating to the held count value to an output circuit 126.

The output circuit 126 (filter circuit or noise removal circuit) receives the data LTQ2 relating to the count value held by the count value holding circuit 124, and outputs the data PWQ. The output circuit 126 may include a comparison circuit 130 which compares the count value currently held by the count value holding circuit 124 with the count value previously held by the count value holding circuit 124, and outputs the larger count value larger, for example. This allows the maximum count value to be held by and output from the output circuit 126. This suppresses a change in pulse width period due to noise or the like, whereby stable pulse width detection can be implemented. Moreover, the pulse width detection method can be easily combined with the amplitude detection method.

Figure 10:
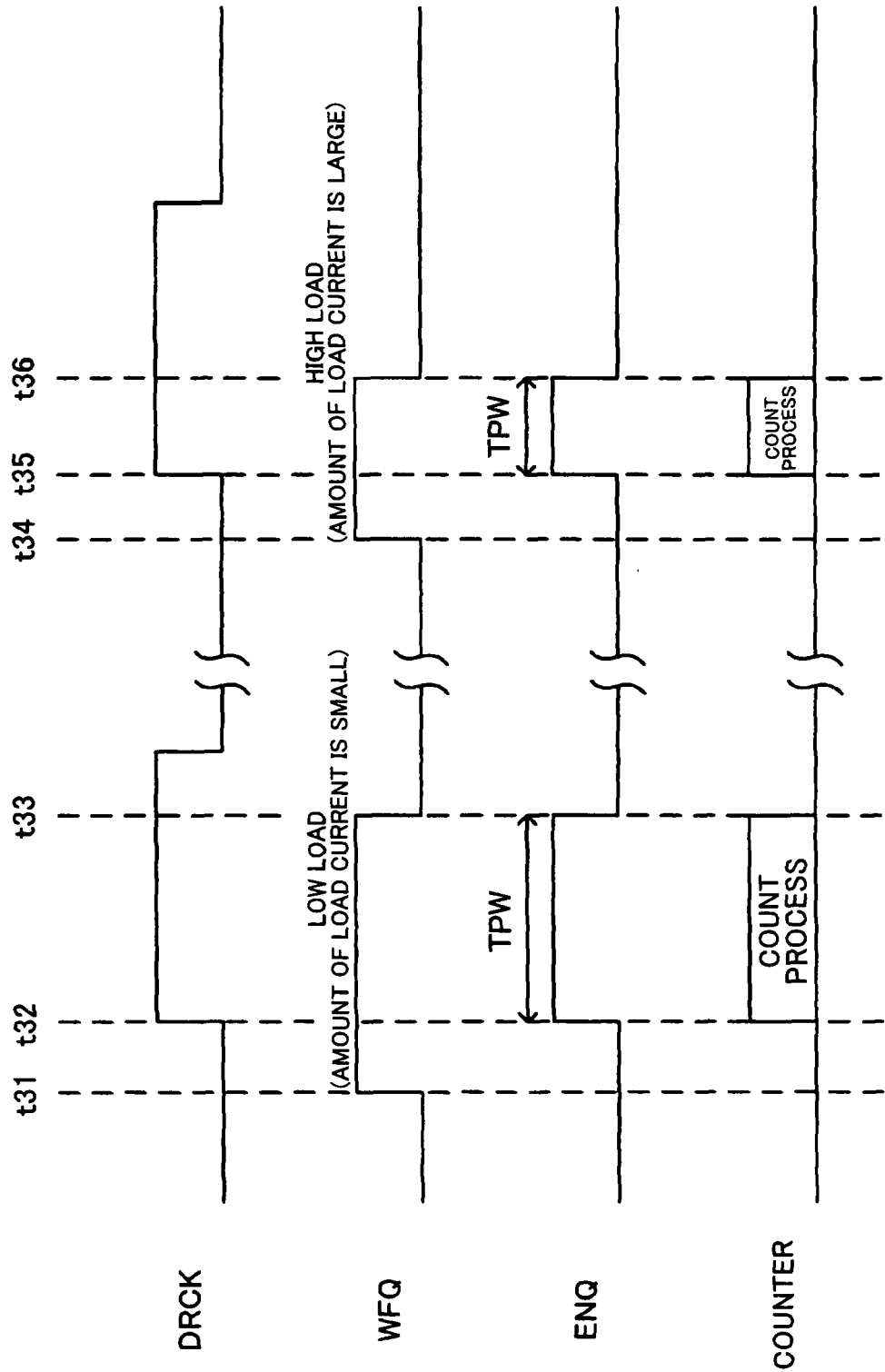
FIG. 10 shows a signal waveform example illustrative of the operation according to one embodiment of the invention.

FIG. 10 shows a signal waveform example illustrative of the operation of the circuit shown in FIG. 9. When the waveform adjusting signal WFQ has been set at the H level at a timing t31, the reset state of the flip-flop circuit FFC1 is canceled. When the drive clock signal DRCK has been set at the H level at a timing t32, the voltage VDD is input to the flip-flop circuit FFC1 at the rising edge of the drive clock signal DRCK, whereby the enable signal ENQ changes from the L level to the H level. As a result, the counter 122 starts the count process and measures the pulse width period TPW using the reference clock signal CLK.

When the waveform adjusting signal WFQ has been set at the L level at a timing t33, the flip-flop circuit FFC1 is reset so that the enable signal ENQ changes from the H level to the L level. This causes the counter 122 to stop the count process. The count value obtained by the count process is the measurement which indicates the pulse width period TPW.

In FIG. 10, the waveform adjusting signal WFQ is set at the H level at a timing t34 and the enable signal ENQ is set at the H level at a timing t35 so that the counter 122 starts the count process. When the waveform adjusting signal WFQ and the enable signal ENQ have been set at the H level at a timing t36, the counter 122 finishes the count process. The count value obtained by the count process is the measurement which indicates the pulse width period TPW.

As shown in FIG. 10, since the pulse width period TPW increases when the power-reception-side load is low, the count value also increases. On the other hand, since the pulse width period TPW decreases when the power-reception-side load is high, the count value also decreases. Therefore, the control circuit 22 can determine whether the power-reception-side load is high or low based on the count value.

Figure 11A:
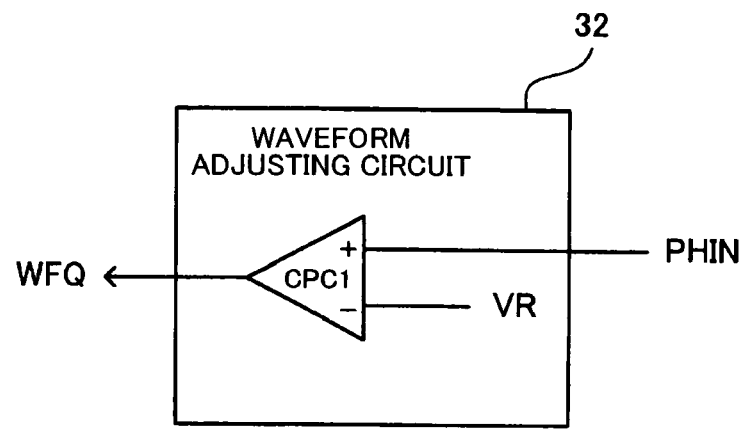
FIGS. 11A and 11B show configuration examples of a waveform adjusting circuit and an enable signal generation circuit.

The configuration of the waveform adjusting circuit 32 is not limited to the configuration shown in FIG. 9. For example, as shown in FIG. 11A, the waveform adjusting circuit 32 may be formed using a comparator CPC1 to which the signal PHIN is input at a non-inverting input terminal (first terminal) and the set voltage VR is input to an inverting input terminal (second terminal). Since the set voltage VR can be arbitrarily regulated using such a comparator CPC1, the load change detection accuracy can be increased.

Figure 11B:
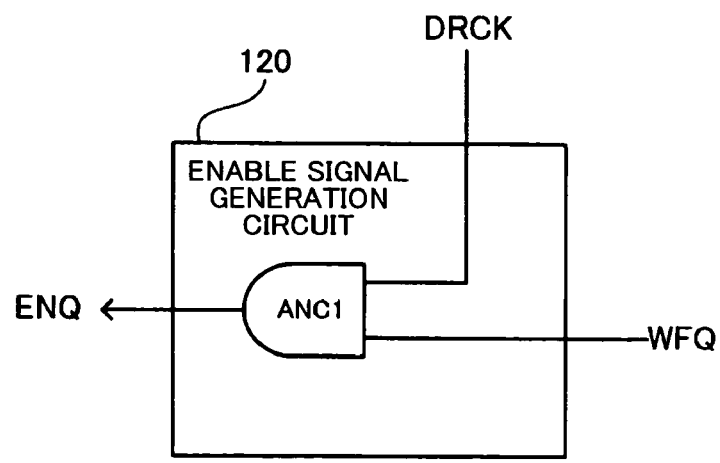

The configuration of the enable signal generation circuit 120 is not limited to the configuration shown in FIG. 9. As shown in FIG. 11B, the enable signal generation circuit 120 may be formed using an AND circuit ANC1 to which the drive clock signal DRCK is input at a first input terminal and the waveform adjusting signal WFQ is input at a second input terminal, for example.

Figure 12:
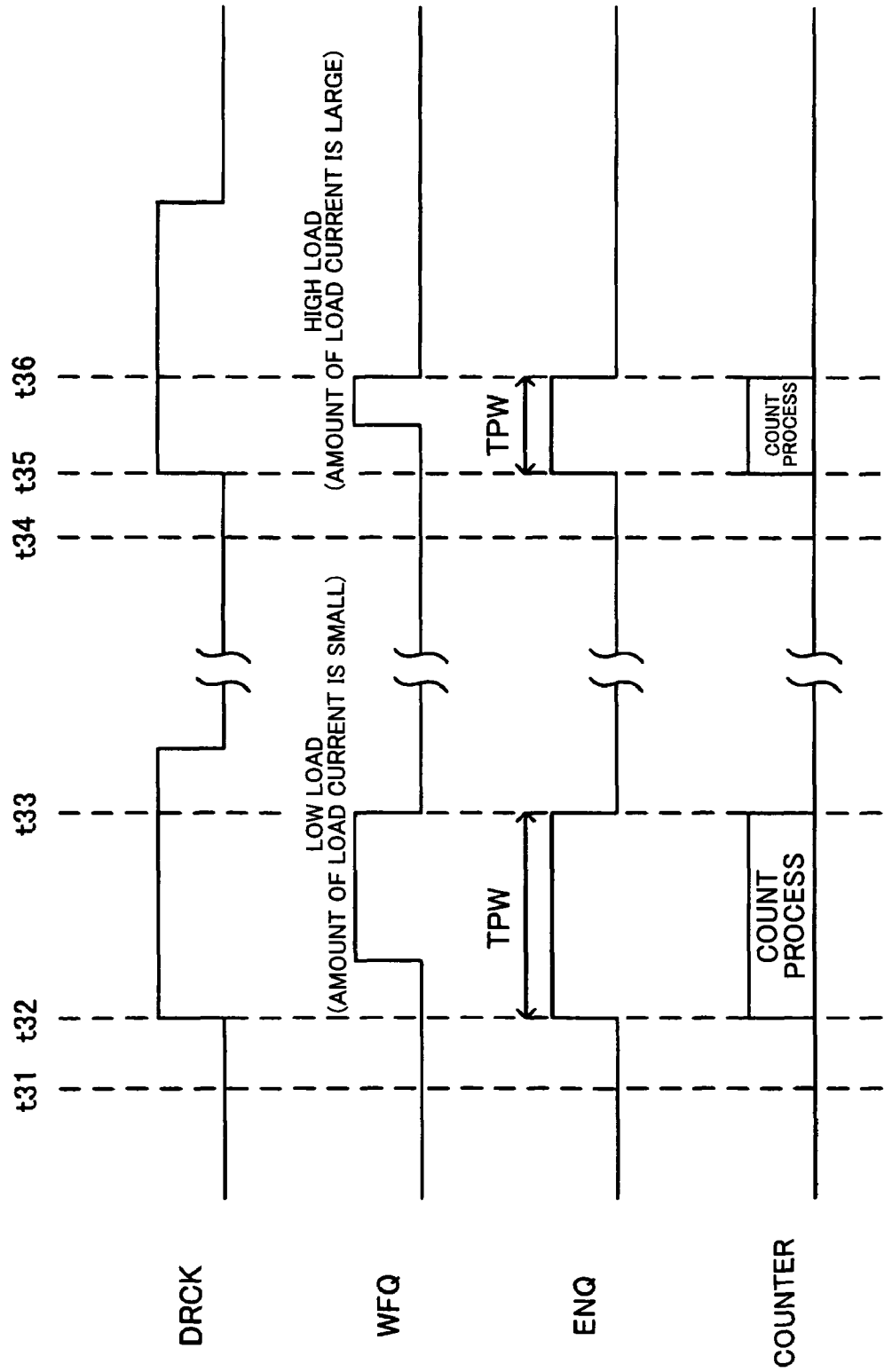
FIG. 12 shows a signal waveform example illustrative of the operation according to one embodiment of the invention.

When using the configuration shown in FIG. 11A for the waveform adjusting circuit 32, it is desirable that the enable signal generation circuit 120 have the configuration shown in FIG. 9. FIG. 12 shows a signal waveform example when the waveform adjusting circuit 32 has the configuration shown in FIG. 11A. As shown in FIG. 12, when employing the waveform adjusting circuit 32 using the comparator CPC1, the rising edge of the waveform adjusting signal WFQ may be delayed with respect to the rising edge (timings t32 and t35) of the drive clock signal DRCK. For example, the amount of delay increases when the set voltage VR input to the comparator CPC1 increases. When the rising edge of the waveform adjusting signal WFQ is delayed, the pulse width period TPW of the enable signal ENQ decreases when forming the enable signal generation circuit 120 using the AND circuit ANC1 shown in FIG. 11B. As a result, the count value obtained by the count process becomes inaccurate.

On the other hand, since the enable signal ENQ rises at the timings t32 and t35, even if the rising edge of the waveform adjusting signal WFQ is delayed, by employing the configuration shown in FIG. 9 for the enable signal generation circuit 120, the pulse width period TPW of the enable signal ENQ does not decrease. Therefore, an accurate count value can be obtained.

Figure 13:
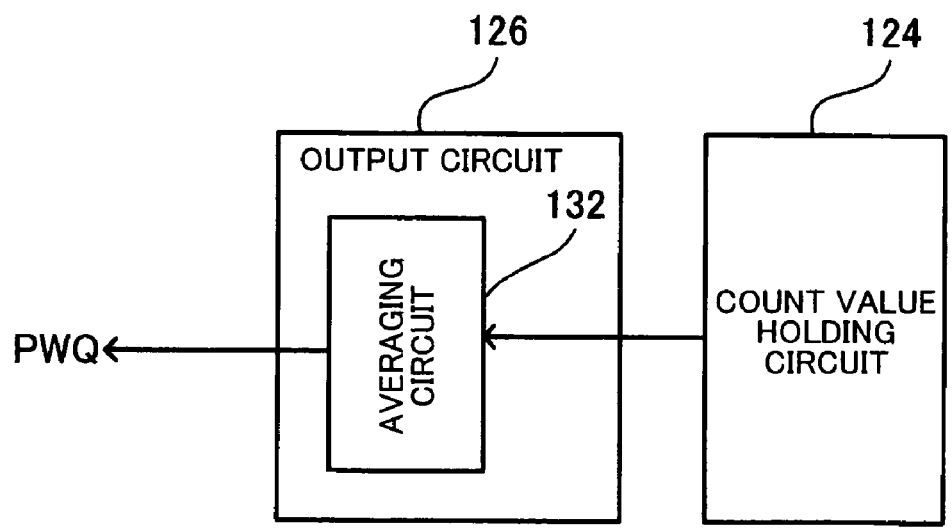
FIG. 13 shows a configuration example of an output circuit.

The configuration of the output circuit 126 is not limited to the configuration shown in FIG. 9. As shown in FIG. 13, the output circuit 126 may be formed using an averaging circuit 132 which calculates an average value (moving average) of a plurality of count values (e.g., the present count value and the previous count value) held by the count value holding circuit 124. This enables a noise component superimposed on the count value can be removed using the averaging circuit 132, whereby stable pulse width detection can be implemented. Moreover, the pulse width detection method can be easily combined with the amplitude detection method.

4. Modification

Figure 14:
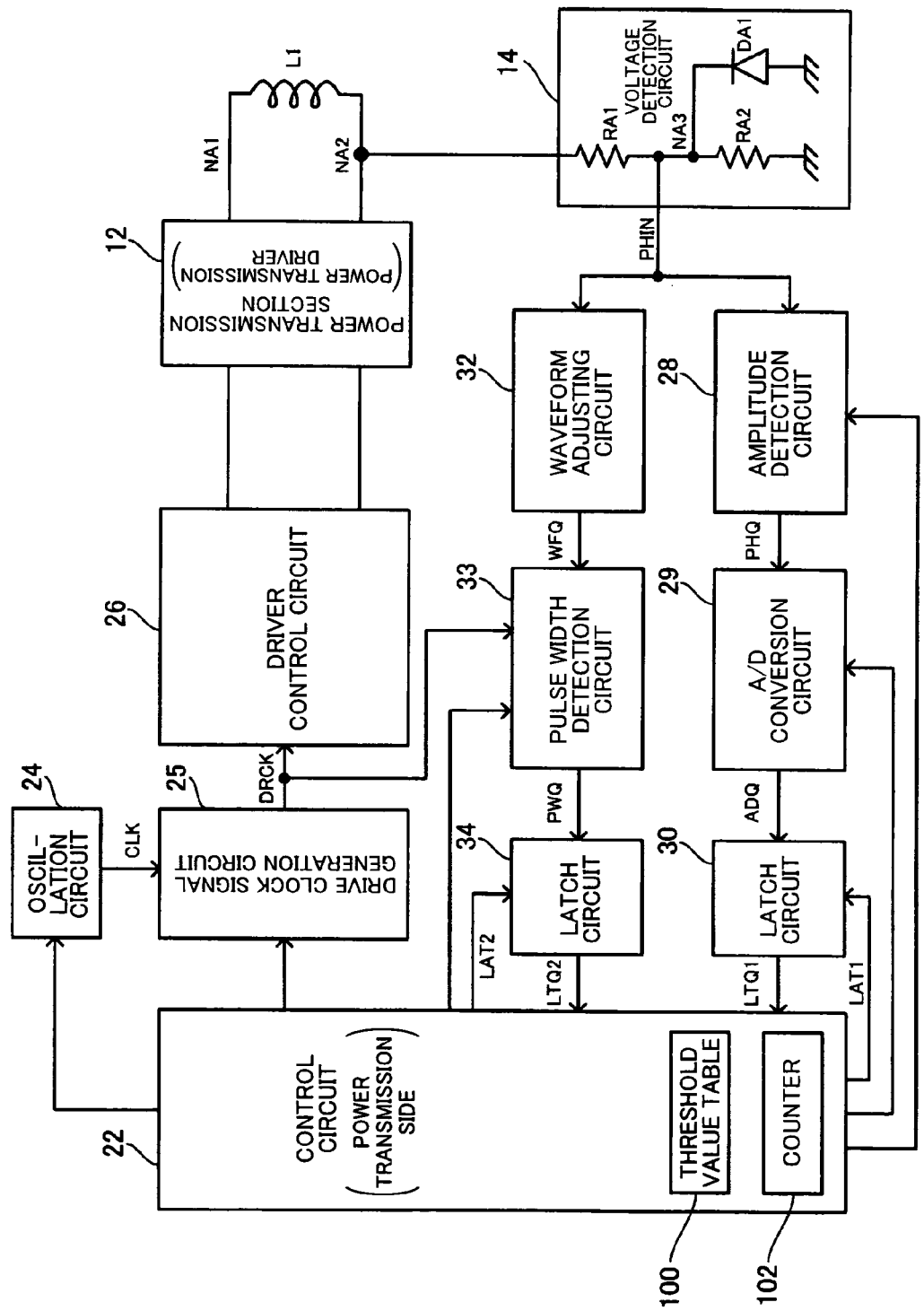
FIG. 14 shows a configuration example according to a modification of one embodiment of the invention.

FIG. 14 shows a modification according to this embodiment. In this modification, the amplitude of the induced voltage signal is also detected in addition to the pulse width of the induced voltage signal. FIG. 14 differs from FIG. 5 in that an amplitude detection circuit 28, an A/D conversion circuit 29, a latch circuit 30, and the like are added. The configuration of the modification is not limited to the configuration shown in FIG. 14. For example, elements such as the A/D conversion circuit 29 and the latch circuits 30 and 34 may be omitted. For example, a plurality of comparators which compare the peak voltage with the threshold voltage may be provided instead of the A/D conversion circuit 29.

The amplitude detection circuit 28 detects amplitude information (peak voltage, amplitude voltage, and root-mean-square voltage) relating to the signal PHIN which corresponds to the induced voltage at one end of the primary coil L1 to detect a change in power-reception-side load. This enables foreign object detection, detachment detection, data detection, and the like. Note that the amplitude detection circuit 28 may determine whether the power-reception-side load has increased or decreased using the peak voltage or a physical quantity (amplitude voltage or root-mean-square voltage) other than the peak voltage.

The A/D conversion circuit 29 subjects the detected voltage to A/D conversion at a conversion timing at which a given period has expired from the timing at which the detected voltage (peak voltage) detected by the amplitude detection circuit 28 has exceeded a provisional voltage (provisional threshold voltage) to determine digital data relating to a reference threshold voltage. The control circuit 22 performs at least one of foreign object detection, detachment detection, and data detection using the digital data relating to the reference threshold voltage.

Specifically, the control circuit 22 starts a count process using a counter 102 from the timing at which the detected voltage has exceeded the provisional voltage (SIGH0), and the A/D conversion circuit 29 performs A/D conversion at the conversion timing set based on the count value of the counter 102. More specifically, the amplitude detection circuit 28 detects the peak voltage (i.e., amplitude information) by holding the peak voltage of the induced voltage signal (half-wave rectified signal) of the primary coil L1 at a hold node. The control circuit 22 performs reset control which discharges the hold node toward a low-potential-side power supply at a reset timing (reset period) at which a first period has expired from the timing at which the peak voltage has exceeded the provisional voltage. The A/D conversion circuit 29 subjects the peak voltage to A/D conversion at the conversion timing at which a second period has expired from the reset timing to determine the digital data relating to the reference threshold voltage (SIGHV).

For example, when the amplitude detection circuit 28 detects the amplitude information relating to the signal PHIN, if the inductance of the primary coil L1, the capacitance of the capacitor which forms the resonant circuit, the power supply voltage, or the like changes, the detected voltage (peak voltage, amplitude voltage, or root-mean-square voltage) detected by the amplitude detection circuit 28 also changes. Therefore, when the reference threshold voltage (determination voltage) for determining, foreign object detection, detachment detection, or data detection is a fixed value, accurate detection may not be implemented.

Therefore, FIG. 14 employs a method in which the A/D conversion circuit 29 is provided, and A/D conversion is performed at a timing at which a given period has expired from the timing at which the provisional voltage (standard voltage) has been exceeded to automatically correct the detection determination reference threshold voltage.

Figure 15:
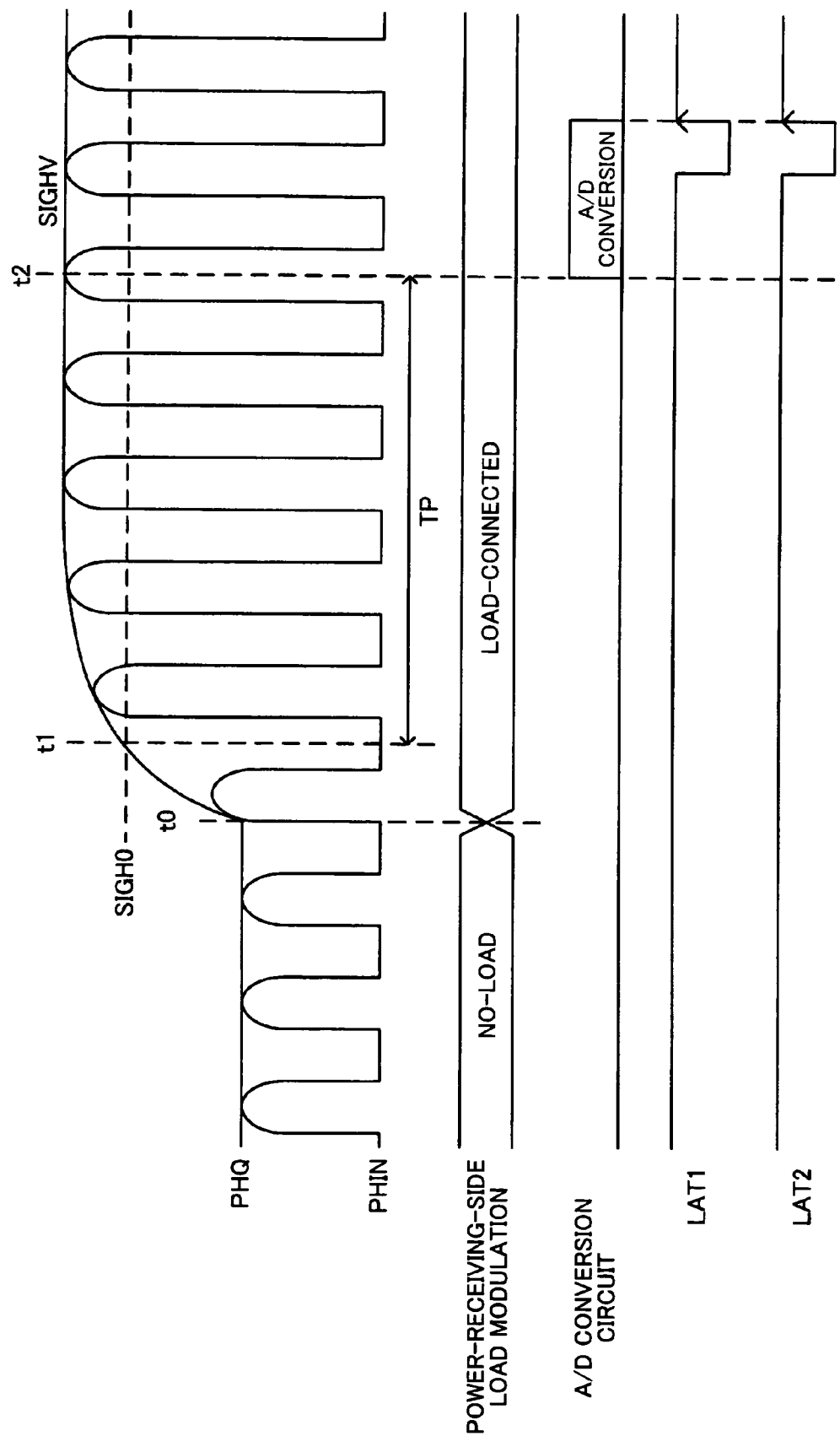
FIG. 15 shows a signal waveform example illustrative of the operation according to a modification.

Specifically, the provisional voltage SIGH0 shown in FIG. 15 is set. The provisional voltage SIGH0 is a voltage between the peak voltage (detected voltage in a broad sense) when the load modulation section 46 of the power reception device 40 shown in FIG. 2 has no load (TB3 is turned OFF) and the peak voltage when the load modulation section 46 has load (TB3 is turned ON). For example, the provisional voltage SIGH0 is 2.5 V. A configuration may be employed in which the provisional voltage SIGH0 can be variably set using a register.

The A/D conversion circuit 29 subjects the peak voltage to A/D conversion at a conversion timing t2 at which a given period TP has expired from a timing t1 at which the peak voltage (signal PHQ) of the induced voltage signal PHIN has exceeded the provisional voltage SIGH0. The A/D conversion circuit 29 determines and outputs digital data ADQ relating to a reference threshold voltage SIGHV. The latch circuit 30 latches the data ADQ. The control circuit 22 performs foreign object detection, detachment detection, or data detection using the data ADQ latched by the latch circuit 30. Specifically, the control circuit 22 detects a foreign object (metal other than the secondary coil) placed on the primary coil of the charger, detects detachment (removal) of the electronic instrument such as a portable telephone placed on the charger, or detects whether or not the data transmitted from the power reception device 40 by means of load modulation is "0" or "1".

For example, when the transistor TB3 of the power-reception-side load modulation section 46 is turned on at a timing t0 shown in FIG. 15 so that the load state changes from a no-load state (load is not connected) to a load-connected state (load is connected), the peak voltage of the induced voltage signal PHIN increases. In FIG. 15, the provisional voltage SIGH0 (provisional threshold voltage) is set in order to detect such an increase in the peak voltage. The provisional voltage SIGH0 is a voltage which is not exceeded when no load is connected to the power-reception-side instrument. The power transmission control device 20 can reliably determine that load is connected to the power-reception-side instrument when the peak voltage has exceeded the provisional voltage SIGH0. Therefore, A/D conversion is performed at the timing t2 at which a sufficient period TP has expired from the timing t1 and the level of the peak voltage has been stabilized to determine the reference threshold voltage SIGHV. Specifically, the control circuit 22 starts a count process (increments or decrements a count value) using a counter 102 at the timing t1 at which the provisional voltage SIGH0 has been exceeded. The control circuit 22 controls the A/D conversion circuit 29 to perform A/D conversion at the conversion timing t2 set based on the count value of the counter 102 to determine the reference threshold voltage SIGHV.

The control circuit 22 performs foreign object detection, detachment detection, or data detection foreign object based on the reference threshold voltage SIGHV. Specifically, the control circuit 22 obtains a foreign object detection, detachment detection, or data detection foreign object threshold voltage by subtracting or adding a foreign object detection, detachment detection, or data detection foreign object parameter voltage from or to the reference threshold voltage SIGHV. The control circuit 22 performs at least one of foreign object detection, detachment detection, or data detection foreign object based on the resulting threshold voltage.

FIG. 16 shows an example of a threshold value table 100 used to calculate data detection, overload detection, foreign object detection, and detachment detection threshold voltages VSIGH, VOVER, VMETAL, and VLEAVE. The control circuit 22 calculates the threshold voltages VSIGH, VOVER, VMETAL, and VLEAVE using the threshold value table 100. For example, the data detection threshold voltage VSIGH is calculated by subtracting a data detection parameter voltage PV1 from the reference threshold voltage SIGHV. The threshold voltage VOVER is calculated by adding an overload detection parameter voltage PV2 to the reference threshold voltage SIGHV. The threshold voltage VMETAL is calculated by adding a foreign object detection parameter voltage PV3 to the reference threshold voltage SIGHV. The threshold voltage VLEAVE is calculated by subtracting a detachment detection parameter voltage PV4 from the reference threshold voltage SIGHV.

In this embodiment, the control circuit 22 initially performs overload detection. When an overload has been detected, the control circuit 22 performs foreign object detection and detachment detection by switch-controlling the voltage division node of the voltage detection circuit 14. In this case, the parameter voltages PV1, PV2, PV3, and PV4 may be respectively set at 0.3 V, 0.8 V, 0.8 V, and 0.1 V, for example. For example, when SIGHV=3.0 V, VSIGH=3.0-0.3=2.7 V. Therefore, the data detection threshold voltage VSIGH is set at a voltage between the reference threshold voltage SIGHV (3.0 V) and the provisional voltage SIGH0 (2.5 V).

According to the pulse width detection method, when the inductance of the coil, the capacitance of the capacitor, or the power supply voltage has changed, the reference threshold voltage SIGHV changes depending on the change in the inductance of the coil, the capacitance of the capacitor, or the power supply voltage, and the foreign object detection, detachment detection, or data detectionforeign object threshold voltages VMETAL, VLEAVE, and VSIGH calculated based on the reference threshold voltage SIGHV also change. Specifically, the threshold voltages VMETAL, VLEAVE, and VSIGH are automatically corrected depending on the reference threshold voltage SIGHV which changes depending on an element variation or the like. This enables an element variation to be automatically absorbed, whereby a stable detection operation can be implemented. The reference threshold voltage SIGHV is subjected to A/D conversion at the timing t2 at which a sufficient period TP has expired from the timing t1 at which a change in the power-reception-side load state from a no-load state to a load-connected state has been reliably detected using the provisional voltage SIGH0. This prevents a situation in which an incorrect reference threshold voltage SIGHV is detected, whereby a stable detection operation without erroneous detection can be implemented.

Note that the peak voltage may exceed the provisional voltage SIGH0 when the secondary coil L2 approaches the primary coil L1 or a foreign object is provided. In this case, since the subsequent load modulation sequence does not coincide with the sequence specified in advance, an ID authentication error and restart occur. Therefore, no problem occurs.

FIG. 15 shows an example in which the detected voltage of the amplitude detection circuit 28 is the peak voltage. Note that the amplitude information is not limited to the peak voltage. It suffices that the amplitude information be a physical quantity which indicates the degree of the amplitude of the induced voltage signal. For example, the amplitude information may be a root-mean-square voltage which indicates the power of the induced voltage signal, or may be the amplitude voltage of the induced voltage signal.

Figure 17:
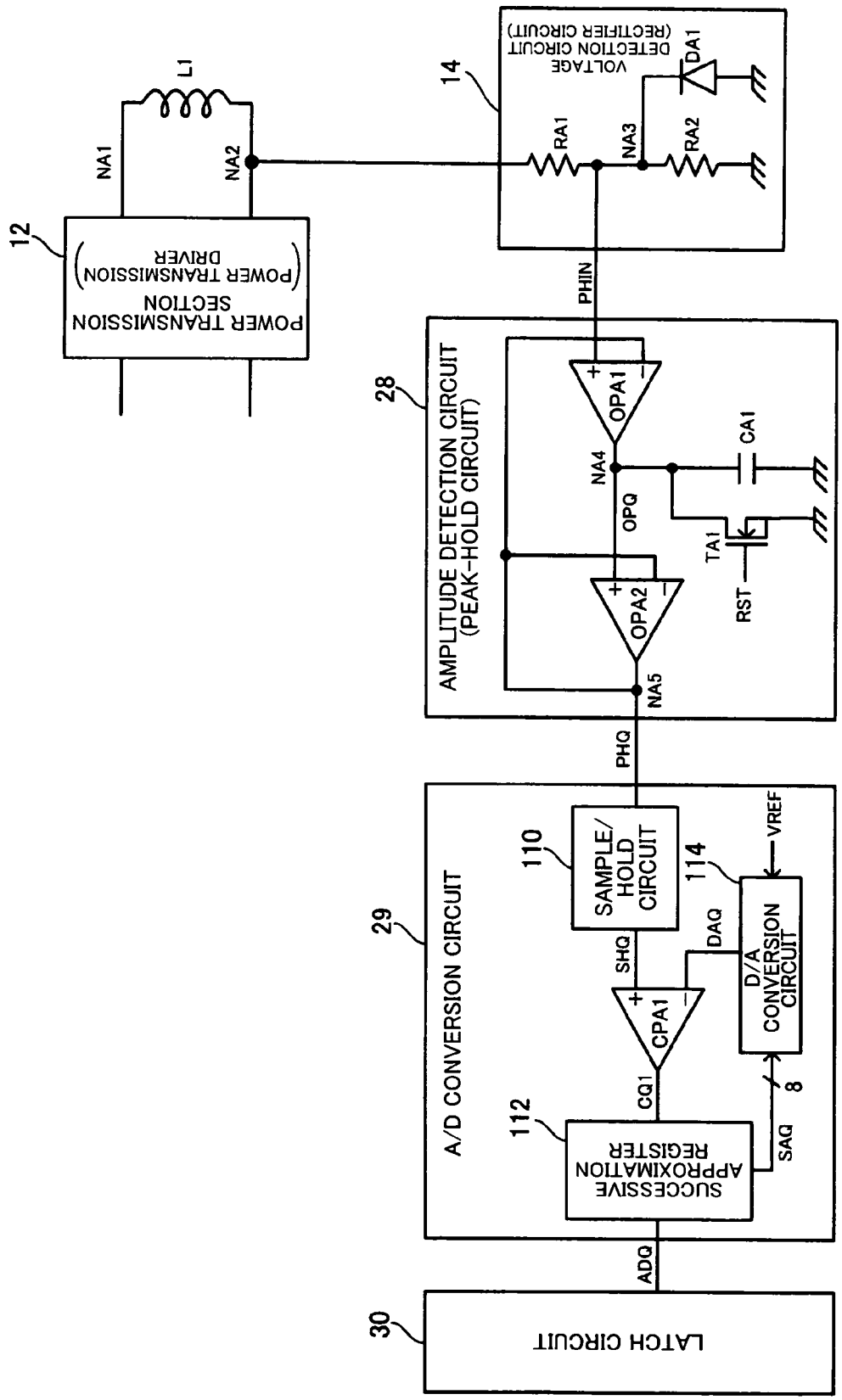
FIG. 17 shows a detailed configuration example according to a modification.

FIG. 17 shows a detailed configuration example of the amplitude detection circuit 28 and the A/D conversion circuit 29. In FIG. 17, the amplitude detection circuit 27 includes operational amplifiers OPA1 and OPA2, a hold capacitor CA1, and a reset N-type transistor TA1. The signal PHIN is input to a non-inverting input terminal of the operational amplifier OPA1, and an output node NA5 of the operational amplifier OPA2 is connected to an inverting input terminal of the operational amplifier OPA1. The hold capacitor CA1 and the reset transistor TA1 are provided between a peak voltage hold node NA4 (i.e., output node of the operational amplifier OPA1) and the power supply GND (low-potential-side power supply). The hold node NA4 is connected to a non-inverting input terminal of the operational amplifier OPA2, and the output node NA5 of the operational amplifier OPA2 is connected to an inverting input terminal of the operational amplifier OPA2 so that the operational amplifier OPA2 forms a voltage-follower-connected operational amplifier. A voltage-follower-connected operational amplifier may be further provided in the subsequent stage of the operational amplifier OPA2.

The operational amplifiers OPA1 and OPA2, the hold capacitor CA1, and the reset transistor TA1 shown in FIG. 17 form a peak-hold circuit (peak detection circuit). Specifically, the peak voltage of the detection signal PHIN from the voltage detection circuit 14 is held by the hold node NA4, and the peak voltage signal held by the hold node NA4 is subjected to impedance conversion by the voltage-follower-connected operational amplifier OPA2 and is output to the node NA5.

The reset transistor TA1 is turned ON in a reset period to discharge the hold node NA4 toward the power supply GND. Specifically, the operational amplifier OPA1 is an operational amplifier which merely stores a charge in the hold capacitor CA1, but cannot discharge a charge toward the power supply GND. Therefore, the operational amplifier OPA1 can follow an increase in the peak voltage of the signal PHIN, but cannot follow a decrease in the peak voltage of the signal PHIN. A leakage current exists in a charge-storage P-type transistor provided in an output section of the operational amplifier OPA1. Therefore, even if the P-type transistor is turned OFF, the voltage of the hold node NA4 increases with the lapse of time. Accordingly, it is necessary to reset the voltage of the hold node NA4 regularly. In FIG. 17, the reset transistor TA1 is provided for the hold node NA4 for the above reasons.

In this embodiment, the power-reception-side instrument detects (extracts) a clock signal from the power-transmission-side alternating-current voltage, and performs load modulation in synchronization with the clock signal. Therefore, since the power-reception-side instrument performs load modulation in synchronization with the power-transmission-side clock signal, the power-transmission-side instrument can uniquely determine the power-reception-side load modulation timing. Therefore, the control circuit 22 specifies the load switch timing of the power-reception-side load modulation, and performs reset control which discharges the hold node NA4 toward the power supply GND in a reset period including the specified switch timing. This implements an appropriate peak-hold operation even when employing the operational amplifier OPA1 which cannot follow a decrease in peak voltage. Moreover, an increase in hold voltage due to a leakage current of the P-type transistor of the operational amplifier OPA1 can be prevented by regularly resetting the voltage of the hold node NA4 in a standby mode when waiting for the peak voltage to exceed the provisional voltage SIGH0.

Figure 18:
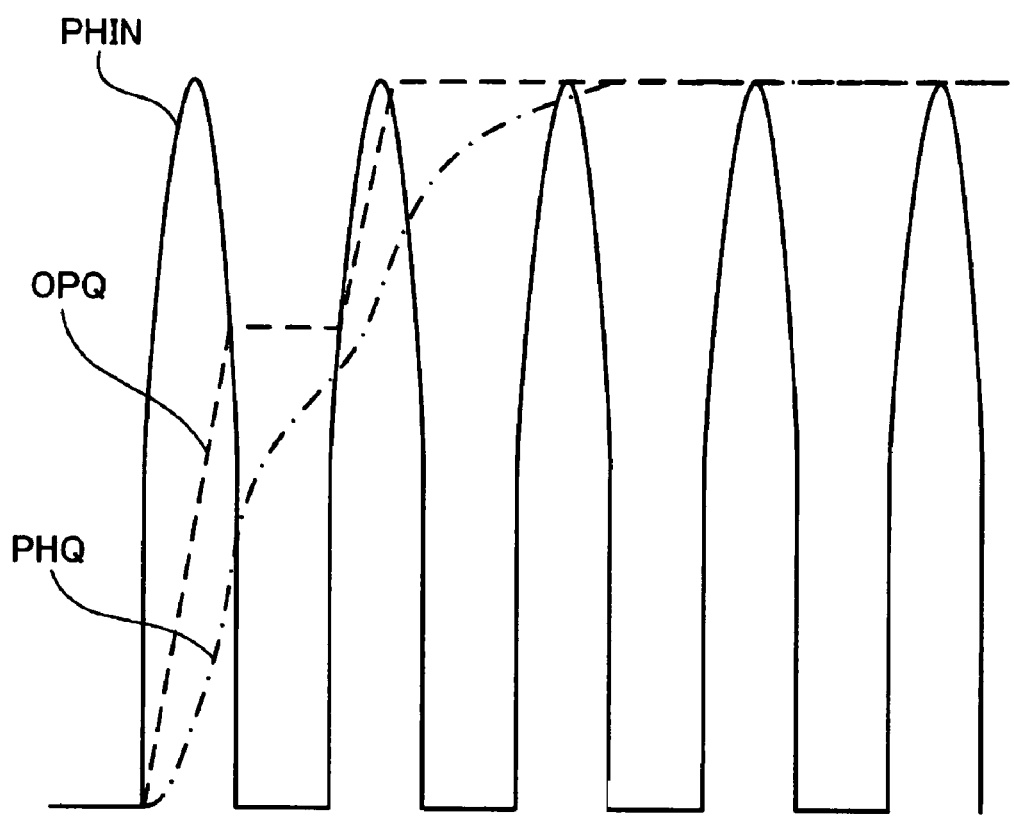
FIG. 18 shows a signal waveform example illustrative of the operation of an amplitude detection circuit.

FIG. 18 shows a signal waveform example illustrative of the operation of the amplitude detection circuit 28. As shown in FIG. 18, the signal PHIN is a signal which is half-wave rectified by the voltage detection circuit 14 which is a half-wave rectifier circuit. The voltage of an output signal OPQ from the operational amplifier OPA1 increases in a pulse generation period of the signal PHIN. The voltage of the output signal OPQ is held by the hold capacitor CA1 and is maintained in a pulse non-generation period. The output signal PHQ from the operational amplifier OPA2 smoothly follows the peak of the signal PHIN.

The A/D conversion circuit 29 includes a sample/hold circuit 110, a comparator CPA1, a successive approximation register 112, and a D/A conversion circuit 114. The sample/hold circuit 110 samples and holds the signal PHQ. The comparator CPA1 compares a D/A-converted analog signal DAQ from the D/A conversion circuit 114 with a sample/hold signal SHQ from the sample/hold circuit 110. The successive approximation register 112 (successive approximation type control circuit) stores data relating to an output signal CQ1 from the comparator CPA1. The D/A conversion circuit 114 subjects digital data SAQ (e.g., eight bits) from the successive approximation register 112 to D/A conversion, and outputs the analog signal DAQ.

In the successive approximation A/D conversion circuit 29, a comparator CPA1 compares the D/A-converted signal DAQ when only the most significant bit (MSB) is set at "1" with the input signal SHQ (PHQ). When the voltage of the signal SHQ is higher than the voltage of the signal DAQ, the comparator CPA1 maintains the MSB at "1". When the voltage of the signal SHQ is lower than the voltage of the signal DAQ, the comparator CPA1 sets the MSB at "0". The A/D conversion circuit 29 performs the successive approximation process on the lower-order bits in the same manner as described above. The A/D conversion circuit 29 outputs the resulting digital data ADQ to the latch circuit 30. Note that the A/D conversion circuit 29 is not limited to the configuration shown in FIG. 17. For example, the A/D conversion circuit 29 may be a successive approximation type A/D conversion circuit having a different circuit configuration, or may be a servo-balancing type, parallel comparison type, or dual-slope type A/D conversion circuit.

Figure 19:
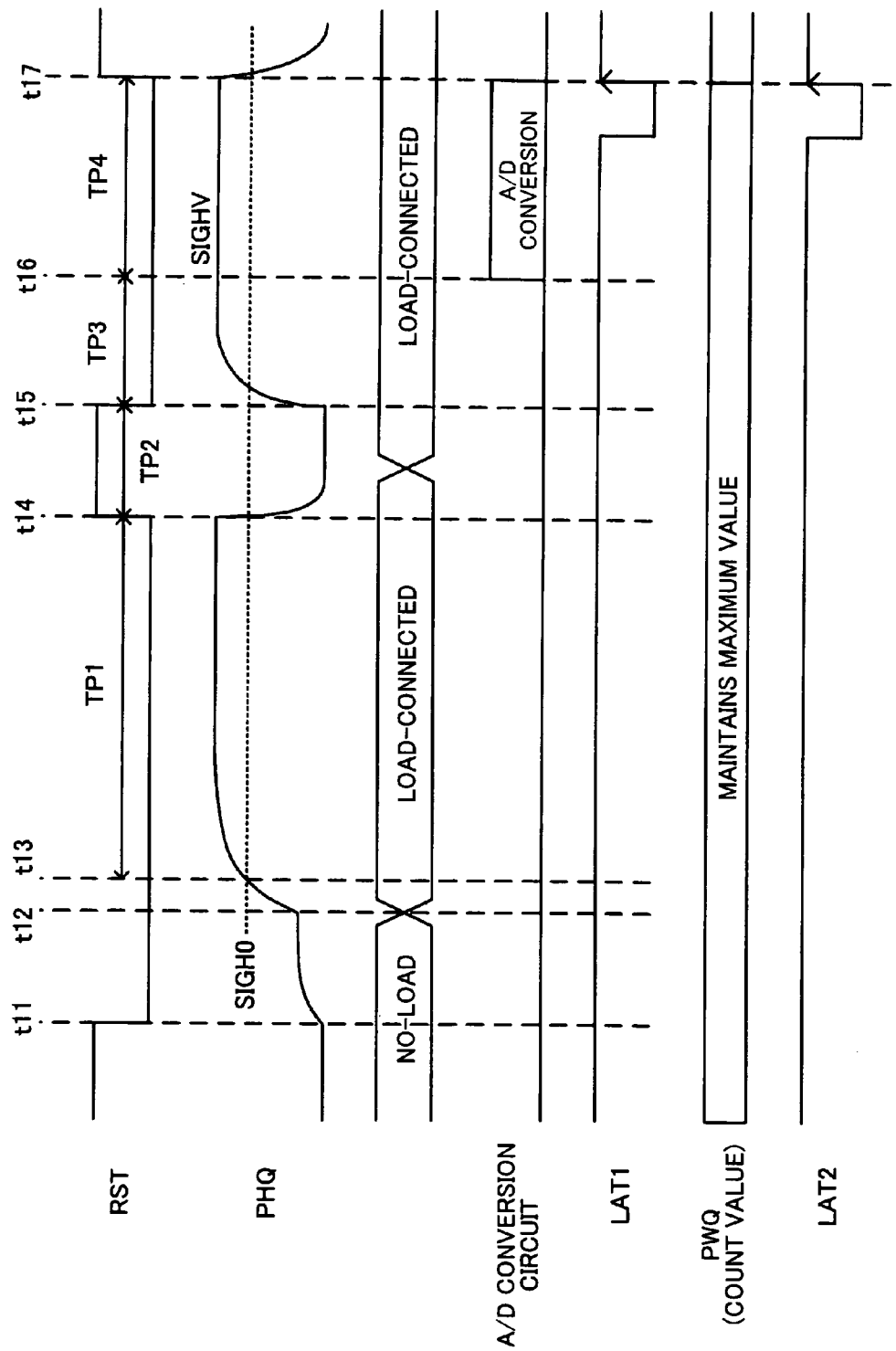
FIG. 19 shows a signal waveform example illustrative of the operation according to a modification.

FIG. 19 shows a signal waveform example illustrative of the operation of the circuit shown in FIG. 17. When a reset signal RST has been set at the L level (inactive) at a timing t11 so that the reset state has been canceled, the peak voltage of the signal PHQ increases to some extent. When the power-reception-side (secondary side) load state has changed from a no-load state to a load-connected state at a timing t12, the peak voltage further increases. When the peak voltage has exceeded the provisional voltage SIGH0 at a timing t13, the count operation using the counter 102 starts. The signal RST is set at the H level (active) at a reset timing t14 at which the period TP1 (e.g., 104 CLK) has expired from the timing t13 so that the transistor TA1 is turned ON, whereby the hold node NA4 is discharged toward the power supply GND. This causes the peak voltage to temporarily decrease. When a reset period TP2 (e.g., 32 CLK) has expired and a timing t15 occurs, the peak voltage again increases since the power-reception-side load remains in a load-connected state. The A/D conversion circuit 29 starts A/D conversion at a conversion timing t16 at which a period TP3 (e.g., 32 CLK) has expired from the timing t15 to determine the digital data relating to the reference threshold voltage SIGHV. A latch signal LAT is set at the H level (active) at a timing t17 at which a period TP4 (e.g., 64 CLK) has expired from the timing t16 so that the digital data relating to the reference threshold voltage SIGHV is latched by the latch circuit 30.

In FIG. 19, reset control which discharges the hold node NA4 toward the low-potential-side power supply is performed at the reset timing t14 at which the period TP1 has expired from the timing at which the peak voltage (PHQ) has exceeded the provisional voltage SIGH0. The A/D conversion circuit 29 subjects the peak voltage to A/D conversion at the conversion timing t16 at which the second period (TP2+TP3) has expired from the timing t14 to determine the digital data relating to the reference threshold voltage SIGHV.

Specifically, the reset period TP2 is provided after the period TP1 has expired after the peak voltage has exceeded the provisional voltage SIGH0 so that the voltage of the hold node NA4 is reset. The output of the amplitude detection circuit 28 (peak-hold circuit) is allowed to stabilize for the period TP3, and A/D conversion is then performed by activating the A/D conversion circuit 29. This enables A/D conversion to be performed after the voltage of the hold node NA4 has been reset and the peak voltage has been stabilized, so the detection accuracy of the reference threshold voltage SIGHV can be increased.

5. Combined use of Pulse Width Detection and Amplitude Detection

According to the configuration shown in FIG. 14, the load change detection accuracy can be increased using pulse width detection and amplitude detection in combination.

Specifically, the control circuit 22 detects data transmitted from the power reception device 40 by means of load modulation based on the pulse width information detected by the pulse width detection circuit 33. On the other hand, the control circuit 22 performs at least one of foreign object detection and detachment detection based on the amplitude information detected by the amplitude detection circuit 28.

More specifically, the control circuit 22 performs data detection based on the pulse width period data PWQ (pulse width information) detected by the pulse width detection circuit 33 and latched by the latch circuit 34. The control circuit 22 performs at least one of foreign object detection and detachment detection based on the digital data relating to the reference threshold voltage determined by the A/D conversion circuit 29 and latched by the latch circuit 30. For example, the control circuit 22 calculates the foreign object detection or detachment detection threshold voltage described with reference to FIG. 16, and performs foreign object detection or detachment detection.

For example, the amplitude detection first latch circuit 30 latches the data ADQ (e.g., reference threshold voltage data) from the A/D conversion circuit 29 based on a latch signal LAT1 at a timing t17 in FIG. 19. The pulse width detection second latch circuit 34 latches the data PWQ (pulse width period data) from the pulse width detection circuit 33 based on a latch signal LAT2. In this case, the second latch circuit 34 latches the data from the pulse width detection circuit 33 at a timing synchronized with the latch timing of the first latch circuit 30. Specifically, the first and second latch circuits 30 and 34 latch the data based on the latch signals LAT1 and LAT2 at the same timing.

This enables the data obtained by pulse width detection and the data obtained by amplitude detection to be latched and input to the control circuit 22 at the same timing. Therefore, circuit compatibility can be maintained between pulse width detection and amplitude detection, whereby the sequence process and the determination process of the control circuit 22 can be simplified.

In FIG. 9, the data PWQ (count value) output from the pulse width detection circuit 33 is always maintained at a maximum value using the comparison circuit 130 of the output circuit 126 in the same manner as the peak voltage detected by the amplitude detection circuit 28, for example. Therefore, circuit compatibility between the amplitude detection circuit 28 and the A/D conversion circuit 29 can be maintained, whereby the system configuration and the sequence can be simplified.

Figure 20A:
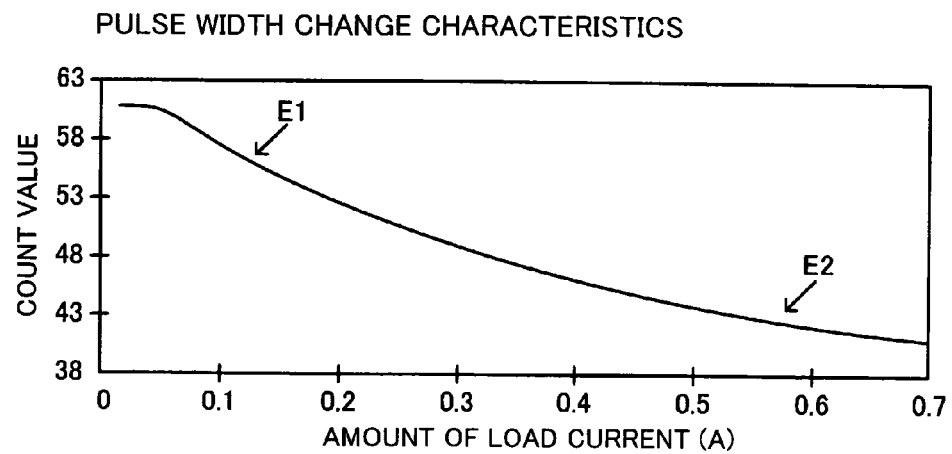
FIGS. 20A and 20B are characteristic diagrams showing a change in pulse width and a change in amplitude.
Figure 20B:
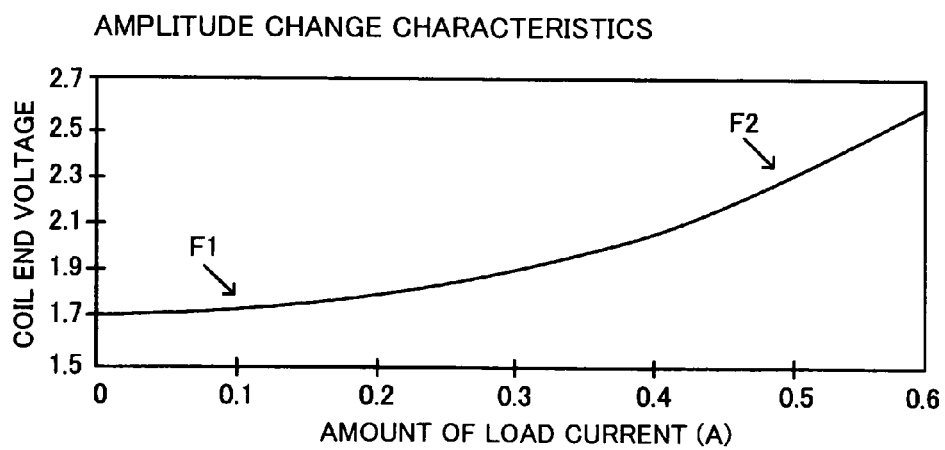

FIG. 20A shows pulse width change characteristics, and FIG. 20B shows amplitude change characteristics. In FIG. 20A, the horizontal axis indicates the amount of power-reception-side load current, and the vertical axis indicates the count value (pulse width period) of the counter 122. In FIG. 20B, the horizontal axis indicates the amount of power-reception-side load current, and the vertical axis indicates the amplitude (peak voltage) of the coil end voltage.

According to the pulse width change characteristics shown in FIG. 20A, when the amount of load current is small (i.e., low load), the change rate of the count value with respect to a change in the amount of load current is large (i.e., sensitivity is high), as indicated by E1. On the other hand, when the amount of load current is large (i.e., high load), the change rate of the count value with respect to a change in the amount of load current is small (i.e., sensitivity is low), as indicated by E2. This is because phase rotation in the load-phase characteristics is saturated as the load becomes heavy due to limitations to the degree of coupling when coupled with a normal coil.

According to the amplitude change characteristics shown in FIG. 20B, when the load is low, the change rate of the coil end voltage with respect to a change in the amount of load current is small (i.e., sensitivity is low), as indicated by F1. On the other hand, when the load is high, the change rate of the count value with respect to a change in the amount of load current is large (i.e., sensitivity high), as indicated by F2.

As described above, the pulse width detection sensitivity is higher in the low-load region than in the high-load region. On the other hand, the amplitude detection sensitivity is higher in the high-load region than in the low-load region. Therefore, it is desirable to determine the degree of load using pulse width detection when the load changes in the low-load region, and determine the degree of load using amplitude detection when the load changes in the high-load region. A change in load can be efficiently detected by selectively using the detection method in low-load region and the high-load region.

Specifically, when detecting data transmitted by means of load modulation, for example, the load changes in a relatively low load region. Therefore, it is desirable to detect the data transmitted from the power reception device 40 by means of load modulation based on the pulse width information detected by the pulse width detection circuit 33. On the other hand, when an overload state occurs (e.g., foreign object detection, detachment detection), it is desirable that the sensitivity in the high-load region be high. Therefore, it is desirable to perform foreign object detection and detachment detection based on the amplitude information detected by the amplitude detection circuit 28. This enables data detection, foreign object detection, detachment detection, and the like to be efficiently implemented with high sensitivity.

Figure 21:
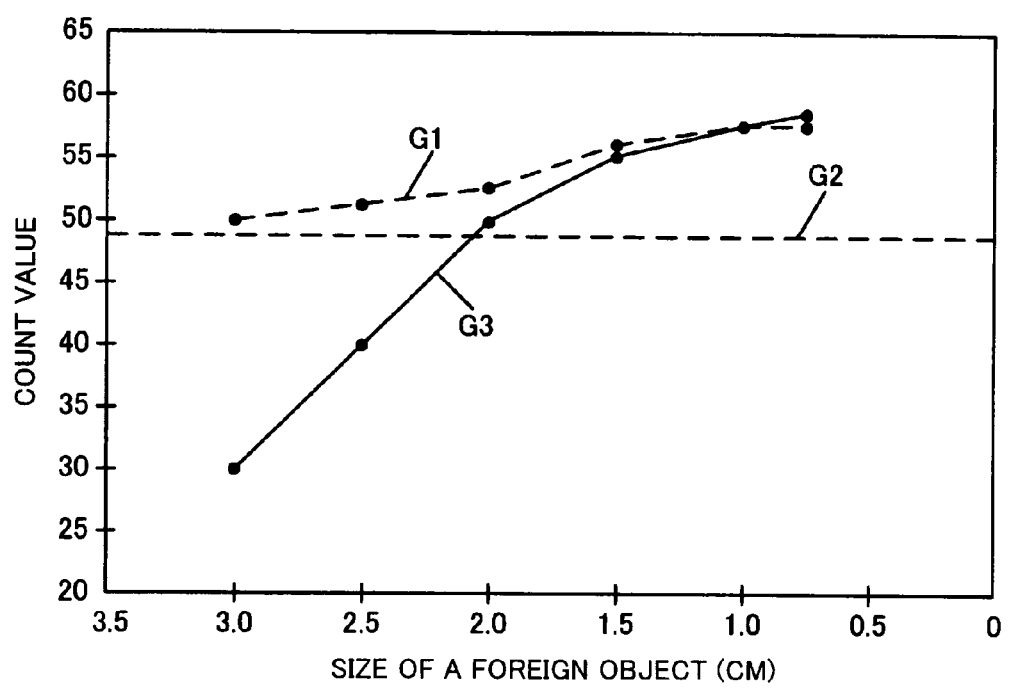
FIG. 21 is a characteristic diagram showing the relationship between the size of a foreign object and a pulse width detection count value.

Note that data detection may be performed based on the amplitude information detected by the amplitude detection circuit 28, or overload detection (e.g., foreign object detection or detachment detection) may be performed based on the pulse width information detected by the pulse width detection circuit 33 depending on the situation. For example, when the load changes in the high-load region during data detection, data detection is performed based on the amplitude information, or performed using the amplitude information and the pulse width information. On the other hand, when the system has a low power supply capability so that the power supply voltage decreases due to an overload, foreign object detection or detachment detection is performed based on the pulse width information, or performed using the pulse width information and the amplitude information.

foreign objectforeign object FIG. 21 shows the relationship between the size of a foreign object and the count value during pulse width detection, for example. G1 indicates change characteristics when the load is normal. G2 indicates a convergence horizontal line of a limit count value observed on the primary side (power reception device) when the load is normal (not foreign object). It is determined that a foreign object exists when the count value is equal to or smaller than the limit count value indicated by G2, as shown by the change characteristics indicated by G3. Specifically, G3 indicates the change characteristics of a foreign object which cannot be detected by amplitude detection. In this case, since an abnormal coupling occurs between the coils and a small count value is observed due to phase rotation which cannot occur when the load is normal (G1), it is determined that a foreign object exists. A more intelligent detection process can be achieved by combining the detection method shown in FIG. 21 with amplitude detection.

Although the embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., GND, VDD, peak voltage, and portable telephone/charger) cited with a different term (e.g., low-potential-side power supply, high-potential-side power supply, detected voltage, and electronic instrument) having a broader meaning or the same meaning at least once in the specification and the drawings can be replaced by the different term in any place in the specification and the drawings. The invention also includes any combination of the embodiments and the modifications. The configurations and the operations of the power transmission control device, the power transmission device, the power reception control device, and the power reception device, the pulse width detection method, and the amplitude detection method are not limited to those described relating to the above embodiments. Various modifications and variations may be made.

What is claimed is:

1. A power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:
a drive clock signal generation circuit that generates a drive clock signal that specifies a drive frequency of the primary coil;
a driver control circuit that generates a driver control signal based on the drive clock signal, and outputs the driver control signal to a transmission driver that drives the primary coil;
a waveform adjusting circuit that adjusts a waveform of an induced voltage signal of the primary coil and outputs a waveform adjusting signal;
a pulse width detection circuit that receives the waveform adjusting signal and the drive clock signal and detects pulse width information relating to the waveform adjusting signal; and
a control circuit that detects a change of secondary-side load based on the pulse width information that has been detected.

2. The power transmission control device as defined in claim 1,
the control circuit detecting data that has been transmitted from the power reception device by means of load modulation based on the detected pulse width information that has been detected.

3. The power transmission control device as defined in claim 1,
the pulse width detection circuit detecting the pulse width information by measuring a pulse width period, the pulse width period being a period from a first point when the drive clock signal changes from an inactive voltage level to an active voltage level to a second point when the waveform adjusting signal changes from an active voltage level to an inactive voltage level.

4. The power transmission control device as defined in claim 3,
the pulse width detection circuit including a counter that increments or decrements a count value during the pulse width period and measures the pulse width period based on the count value.

5. The power transmission control device as defined in claim 4,
the pulse width detection circuit including an enable signal generation circuit that receives the waveform adjusting signal and the drive clock signal and generates an enable signal that becomes active in the pulse width period; and
the counter incrementing or decrementing the count value when the enable signal is active.

6. The power transmission control device as defined in claim 5,
the enable signal generation circuit including a flip-flop circuit that is reset or set when the waveform adjusting signal is active, the drive clock signal being input to a clock signal terminal of the flip-flop circuit and a high-potential-side power supply voltage or a low-potential-side power supply voltage being input to a data terminal of the flip-flop circuit.

7. The power transmission control device as defined in claim 6,
the waveform adjusting circuit including a comparator, the induced voltage signal of the primary coil being input to a non-inverting input terminal of the comparator and a given set voltage being input to an inverting input terminal of the comparator.

8. The power transmission control device as defined in claim 4,
the pulse width detection circuit including:
a count value holding circuit that holds the count value from the counter; and
an output circuit that compares a first count value with a second count value, the first count value being the count value that has been currently held by the count value holding circuit, the second count value being the count value that has been previously held by the count value holding circuit, and outputs a larger count value among the first count value and the second count value.

9. The power transmission control device as defined in claim 4,
the pulse width detection circuit including:

a count value holding circuit that holds the count value from the counter; and an output circuit that outputs an average value of a plurality of count values that have been held by the count value holding circuit.

10. The power transmission control device as defined in claim 1, the power transmission control device further including:

an amplitude detection circuit that detects amplitude information relating to the induced voltage signal of the primary coil;

an A/D conversion circuit that performs A/D conversion of the amplitude information;

a first latch circuit that latches data from the A/D conversion circuit; and a second latch circuit that latches data from the pulse width detection circuit, the second latch circuit latching the data from the pulse width detection circuit at a timing synchronized with a latch timing of the first latch circuit.

11. A power transmission device comprising:

the power transmission control device as defined in claim 1; and a power transmission section that generates an alternating voltage and supplies the alternating voltage to the primary coil.

12. An electronic instrument comprising the power transmission device as defined in claim 11.

13. A non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception device including:

a power reception section that converts an induced voltage in the secondary coil into a direct voltage; and a load modulation section that variably changes a load depending on transmission data when the power reception device transmits data to the power transmission device; and the power transmission device including:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information relating to the waveform adjusting signal; and a control circuit that detects a change in secondary-side load based on the pulse width information that has been detected.

14. A power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a drive clock signal generation circuit that generates a drive clock signal that specifies a drive frequency of the primary coil;

a driver control circuit that generates a driver control signal based on the drive clock signal, and outputs the driver control signal to a transmission driver that drives the primary coil;

a waveform adjusting circuit that adjusts a waveform of an induced voltage signal of the primary coil and outputs a waveform adjusting signal;

a pulse width detection circuit that receives the waveform adjusting signal and the drive clock signal and detects pulse width information of the waveform adjusting signal; and a control circuit that controls the power transmission control device based on the pulse width information that has been detected.

15. A power transmission device comprising:

the power transmission control device as defined in claim 14; and a power transmission section that generates an alternating voltage and supplies the alternating voltage to the primary coil.

16. An electronic instrument comprising the power transmission device as defined in claim 15.

17. A non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power transmission device being the power transmission device as defined in claim 15.

* * * * *